(12) United States Patent
Hwang et al.

(10) Patent No.: US 9,838,894 B2
(45) Date of Patent: Dec. 5, 2017

(54) METHOD FOR TRANSMITTING NETWORK SUPPORT INFORMATION FOR REMOVING INTERFERENCE AND SERVING CELL BASE STATION

(71) Applicant: LG ELECTRONICS INC., Seoul (KR)

(72) Inventors: Jinyup Hwang, Seoul (KR); Sangwook Lee, Seoul (KR); Manyoung Jung, Seoul (KR); Yoonoh Yang, Seoul (KR); Suhwan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

(21) Appl. No.: 14/766,704

(22) PCT Filed: Feb. 7, 2014

(86) PCT No.: PCT/KR2014/001065
§ 371 (c)(1),
(2) Date: Aug. 7, 2015

(87) PCT Pub. No.: WO2014/123389
PCT Pub. Date: Aug. 14, 2014

(65) Prior Publication Data
US 2015/0373569 A1    Dec. 24, 2015

Related U.S. Application Data

(60) Provisional application No. 61/762,332, filed on Feb. 8, 2013.

(51) Int. Cl.
*H04W 24/08*    (2009.01)
*H04J 11/00*    (2006.01)
(Continued)

(52) U.S. Cl.
CPC ......... *H04W 24/08* (2013.01); *H04J 11/0023* (2013.01); *H04L 1/00* (2013.01);
(Continued)

(58) Field of Classification Search
None
See application file for complete search history.

(56) References Cited

U.S. PATENT DOCUMENTS

2008/0108363 A1*    5/2008   Yu ........................ H04W 48/12
                                                              455/450
2009/0227263 A1     9/2009   Agrawal et al.
(Continued)

FOREIGN PATENT DOCUMENTS

JP         5054186 B2      10/2012
KR    10-2009-0121256 A    11/2009
(Continued)

OTHER PUBLICATIONS

Alcatel "Handling of RRM in a Decentralised RAN Architecture", R3-060029, 3GPP TSG RAN WG3, pp. 1-10, Jan. 10-12, 2006, Sophia-Antipolis, France.

*Primary Examiner* — Edan Orgad
*Assistant Examiner* — Sithu Ko
(74) *Attorney, Agent, or Firm* — Birch, Stewart, Kolasch & Birch, LLP

(57)    ABSTRACT

A method is provided for transmitting network assistance information in a serving cell in order to perform interference cancellation of a terminal. The serving cell checks whether a traffic load of the serving cell is greater than or less than a first value, and whether a traffic load of a neighbor cell is greater than or less than a second value. The serving cell determines a target for which the interference cancellation is to be performed by the terminal, based on a result of the checking the traffic load of the serving cell and a result of the
(Continued)

checking the traffic load of the neighbor cell. The serving cell transmits to the terminal the network assistance information including information regarding the determined target for which the interference cancellation is to be performed.

14 Claims, 21 Drawing Sheets

(51) Int. Cl.
*H04L 12/801* (2013.01)
*H04W 28/02* (2009.01)
*H04W 72/04* (2009.01)
*H04W 72/08* (2009.01)
*H04L 1/00* (2006.01)
*H04W 24/02* (2009.01)

(52) U.S. Cl.
CPC ......... *H04L 47/12* (2013.01); *H04W 28/0289* (2013.01); *H04W 72/042* (2013.01); *H04W 72/082* (2013.01); *H04W 24/02* (2013.01)

(56) References Cited

U.S. PATENT DOCUMENTS

| | | |
|---|---|---|
| 2009/0291691 A1 | 11/2009 | Jeong et al. |
| 2012/0082022 A1 | 4/2012 | Damnjanovic et al. |
| 2013/0114449 A1* | 5/2013 | Luo ........................ H04J 11/005 370/252 |
| 2013/0114517 A1* | 5/2013 | Blankenship ......... H04L 5/0053 370/329 |
| 2014/0293948 A1* | 10/2014 | Jiang .................... H04J 11/0056 370/329 |
| 2015/0304062 A1* | 10/2015 | Teyeb ................. H04W 52/243 375/260 |

FOREIGN PATENT DOCUMENTS

| | | |
|---|---|---|
| KR | 10-1201980 B1 | 11/2012 |
| KR | 10-2012-0139847 A | 12/2012 |
| WO | WO 2008/135101 A1 | 11/2008 |
| WO | WO 2009/035983 A1 | 3/2009 |
| WO | WO 2011/130451 A1 | 10/2011 |

\* cited by examiner

FIG. 10
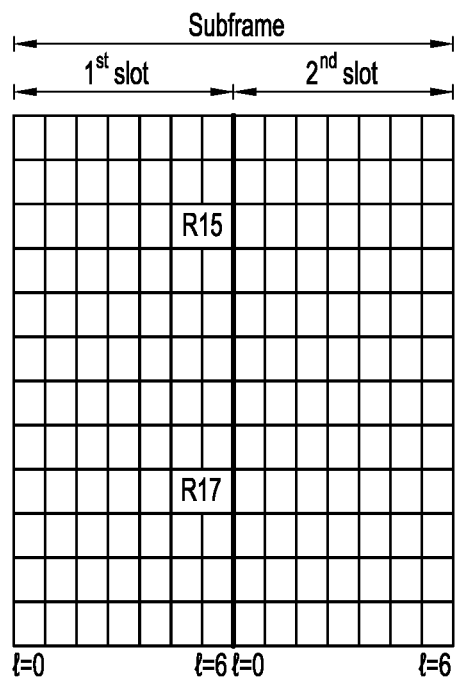
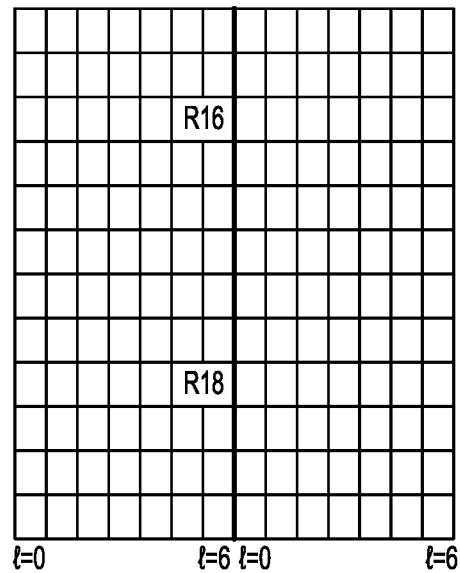
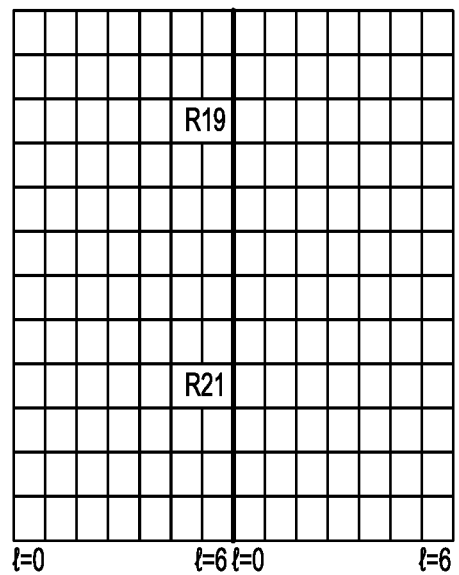
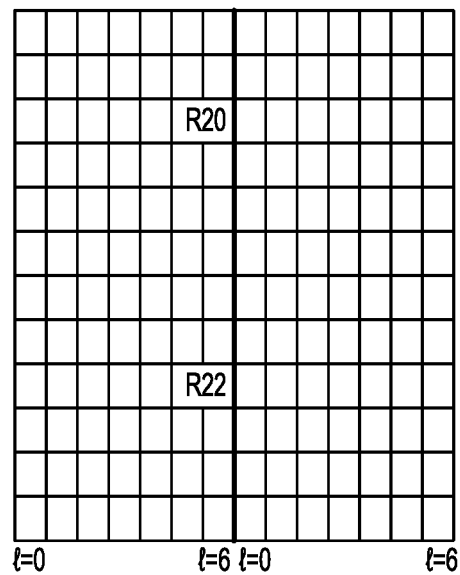

FIG. 12
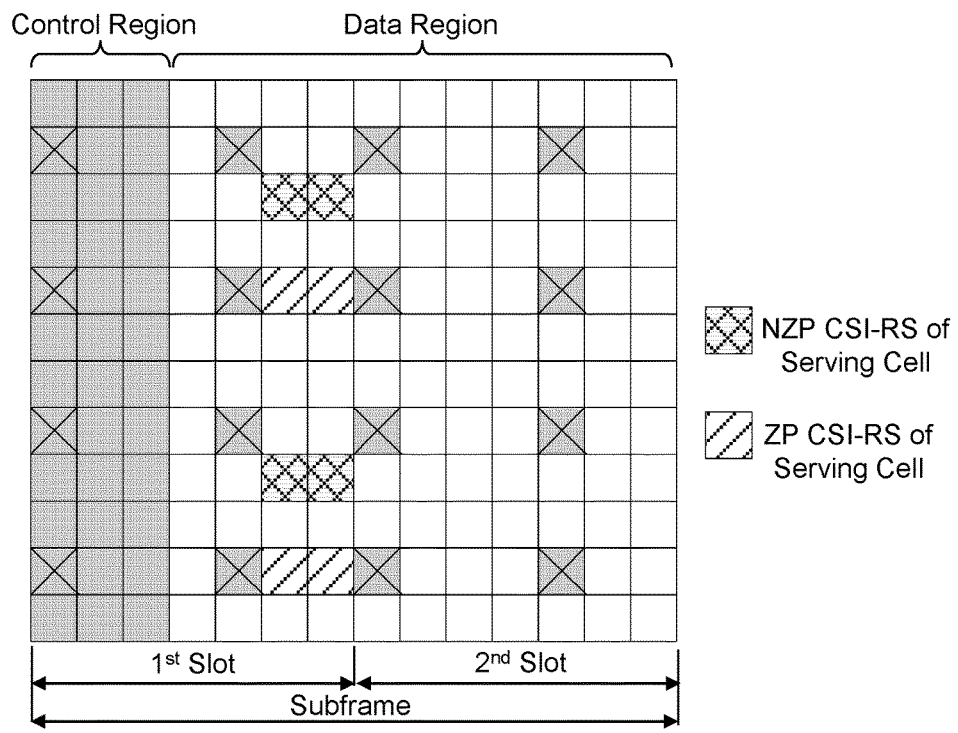
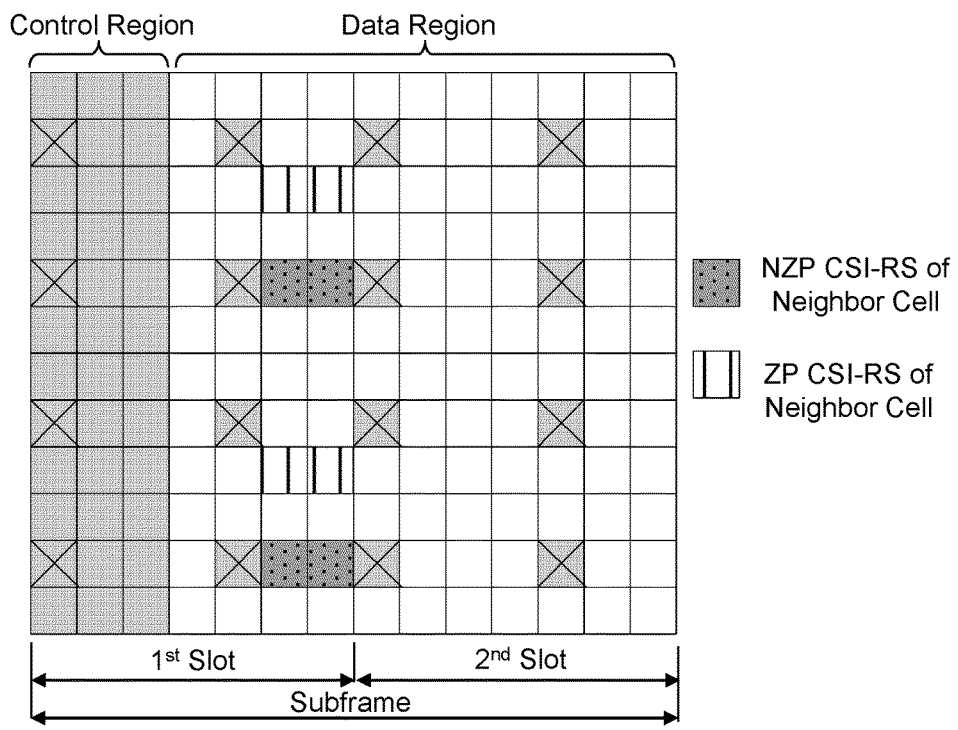

METHOD FOR TRANSMITTING NETWORK SUPPORT INFORMATION FOR REMOVING INTERFERENCE AND SERVING CELL BASE STATION

CROSS REFERENCE TO RELATED APPLICATIONS

This application is the National Phase of PCT International Application No. PCT/KR2014/001065, filed on Feb. 7, 2014, which claims priority under 35 U.S.C. 119(e) to U.S. Provisional Application No. 61/762,332, filed on Feb. 8, 2013, all of which are hereby expressly incorporated by reference into the present application.

BACKGROUND OF THE INVENTION

Field of the Invention

The present specification discloses a method of transmitting network assistance information for removing interference, and a serving cell base station.

Related Art

A 3rd generation partnership project (3GPP) long term evolution (LTE) that improves a universal mobile telecommunications system (UMTS) has been introduced to a 3GPP release 8. The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

Meanwhile, in general, information, e.g., data, is easily distorted and changed when transmitted through a wireless channel. Therefore, a reference signal (RS) is required to demodulate such information in an error-free manner. The RS may be divided into a common RS (CRS) and a user equipment (UE)-specific RS according to whether it is used in common. In addition, according to a usage, the RS may be divided into a demodulation RS (DM-RS) and a channel state indicator RS (CSI-RS).

The CSI-RS is transmitted by a base station (BS) to a UE. On the basis of the CSI-RS, the UE feeds back information indicating a channel state such as CQI/PMI/RI to the BS.

However, a CSI-RS from a neighbor cell may act as interference to the UE according to a situation.

In particular, recently, there is an ongoing discussion on a heterogeneous network in which a macro cell and a small cell co-exist, and due to such a small cell, interference may be more and more increased. Therefore, an interference cancellation capability is desperately required.

SUMMARY OF THE INVENTION

Accordingly, the present specification is disclosed to solve the aforementioned problem.

In order to achieve the aforementioned purpose, one disclosure of the present specification proposes a method of transmitting a network signal to a user equipment (UE) so that the UE can effectively remove interference on a channel state indicator (CSI)-reference signal (RS) or physical downlink shared channel (PDSCH) from a neighbor cell.

More specifically, in order to achieve the aforementioned purpose, one disclosure of the present invention provides a method of transmitting network assistance information in a serving cell in order to perform interference cancellation of a terminal. The method may comprise: checking, by the serving cell, whether a traffic load of the serving cell is greater than or less than a first threshold value; checking, by the serving cell, whether a traffic load of a neighbor cell is greater than or less than a second threshold value; determining a target for which the interference cancellation is to be performed by the terminal, based on a result of the checking the traffic load of the serving cell and a result of the checking the traffic load of the neighbor cell; and transmitting to the terminal the network assistance information including information regarding the determined target for which the interference cancellation is to be performed.

In the determining of the interference cancellation target, it may be determined whether the target for which the interference cancellation is to be performed is a neighbor cell's channel state indicator reference signal (CSI-RS) or a physical downlink shared channel (PDSCH).

If the traffic load of the serving cell is below the first threshold and the traffic load of the neighbor cell is also below the second threshold, the target for which the interference cancellation is to be performed by the terminal is determined as null. Here, a zero power (ZP) CSI-RS is allocated by the serving cell at a location of a neighbor cell's non zero power (NZP) CSI-RS resource.

If the traffic load of the serving cell is below the first threshold but the traffic load of the neighbor cell is above the second threshold, a neighbor cell's PDSCH is determined as the target for which the interference cancellation is to be performed by the terminal.

Alternatively, if the traffic load of the serving cell is above the first threshold but the traffic load of the neighbor cell is below the second threshold, a neighbor cell's NZP CSI-RS is determined as the target for which the interference cancellation is to be performed by the terminal.

Alternatively, if the traffic load of the serving cell is above the first threshold and the traffic load of the neighbor cell is also above the second threshold, the neighbor cell's CSI-RS and PDSCH are determined as the target for which the interference cancellation is to be performed by the terminal.

Alternatively, if the neighbor cell's NZP CSI-RS is determined as the target for which the interference cancellation is to be performed by the terminal, the network assistance information includes one or more of the number of neighbor cell's antenna ports, resource configuration information of the CSI-RS, subframe configuration information of the CSI-RS, a scrambling code seed, and information of a power ratio between the PDSCH and the CSI-RS.

Meanwhile, in order to achieve the aforementioned purpose, one disclosure of the present specification provides a serving cell base station for transmitting network assistance information in order to perform interference cancellation of a terminal. The serving cell base station may comprise: a transceiver and a processor. The processor may be configured to check whether a traffic load of a serving cell associated with the serving cell base station is greater than or less than a first value, check whether a traffic load of a neighbor cell is greater than or less than a second value, determine a target for which the interference cancellation is to be performed by the terminal, based on a result of the check of the traffic load of the serving cell and a result of the check of the traffic load of the neighbor cell, and control the transceiver to transmit to the terminal the network assistance information including information regarding the determined target for which the interference cancellation is to be performed.

According to a disclosure of the present specification, by the use of neighbor cell's network assistance information transmitted from a serving cell, a UE can relatively simply remove interference caused by a neighbor cell's CSI-RS without an increase in complexity. Therefore, reception performance for a signal from the serving cell can be improved.

BRIEF DESCRIPTION OF THE DRAWINGS

FIG. 10 illustrates an example of a resource block (RB) to which a CSI-RS is mapped among reference signals.
FIG. 12 illustrates an example in which resources are allocated to avoid interference caused by a CSI-RS between cells.
FIG. 14b is a block diagram illustrating operations of the interference cancellation unit shown in FIG. 14a.

DESCRIPTION OF EXEMPLARY EMBODIMENTS

Figure 1:
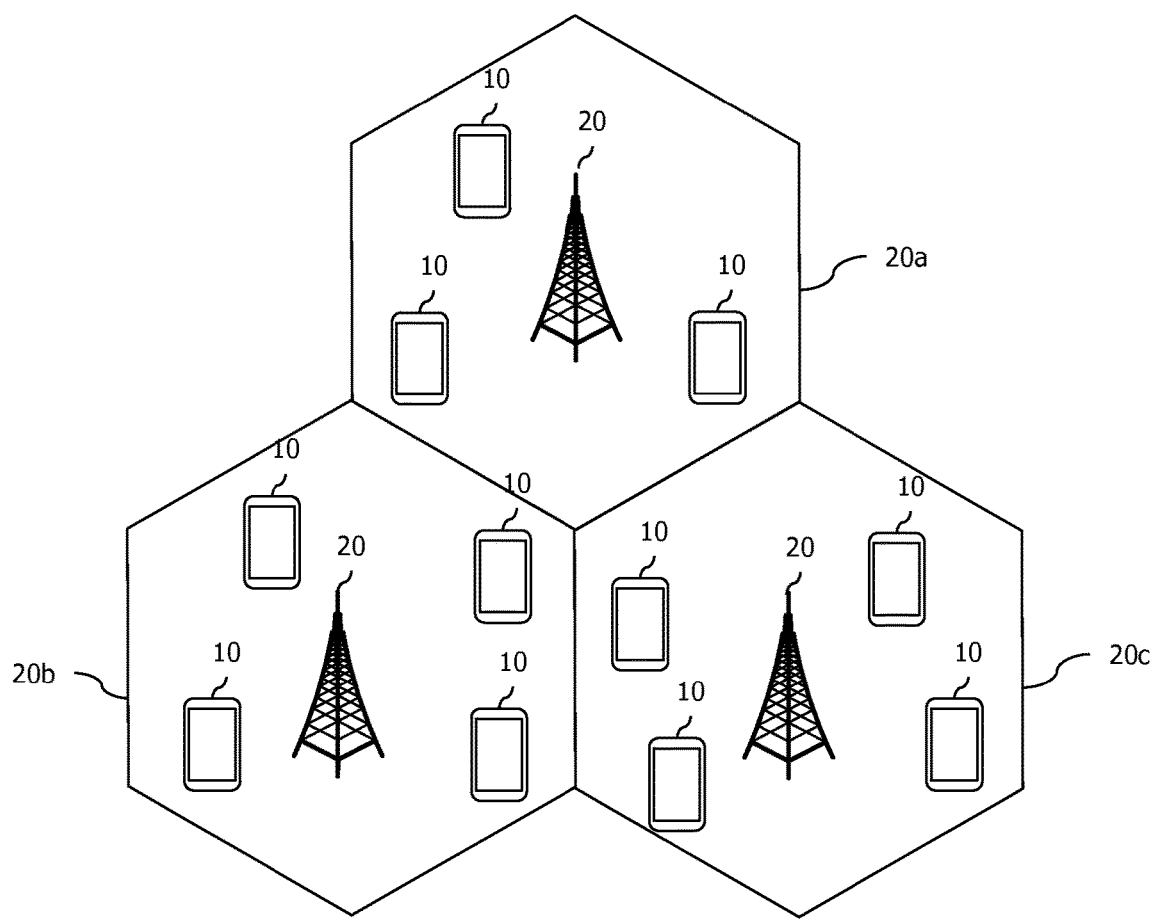
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20a, 20b, and 20c (which are generally called cells). Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
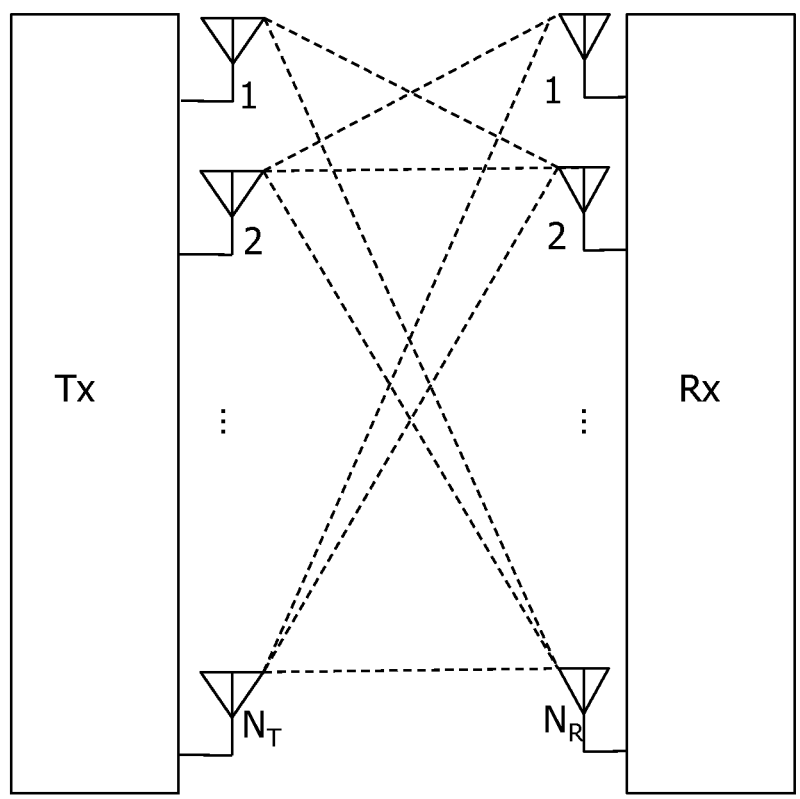
FIG. 2 illustrates a general multiple antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below.

$$R_i = \min(N_T, N_R) \quad \text{[Equation 1]}$$

The transmission information may include up to $N_T$ different pieces of information when the number of transmission antennas is $N_T$. In this case, the transmission information may be represented as in Equation 2.

$$s = [s_1, s_2, \ldots, s_{N_T}]^T \quad \text{[Equation 2]}$$

In Equation 2, s refers to a transmission information vector, and $s_1, s_2, \ldots, s_{N_T}$ represent the respective elements of transmission information vectors. Each information may be transmitted having a different transmission power. When the respective transmission powers are represented as ($P_1, P_2, \ldots, P_{N_T}$), a transmission information vector to which a transmission power is applied may be represented as in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Equation 3 may be represented as the product of a transmission power diagonal matrix and a transmission information vector as in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Transmission signals ($x_1, x_2, \ldots, x_{N_T}$) that are actually transmitted through $N_T$ transmission antennas are generated by multiplying a transmission information vectors $\hat{s}$ to which transmission power is applied by a weight matrix W. The weight matrix W functions to properly distribute transmission informations to individual antennas depending on transmission channel conditions. Assuming that a transmission signal vector is x, the following equation may be obtained.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, an element in the weight matrix, $w_{ij}$ ($1 \leq i \leq N_T$, $1 \leq j \leq N_T$), represents a weight for an ith transmission antenna and a jth transmission information. The weight matrix W is also denoted a precoding matrix.

A transmission signal vector may include different transmission informations depending on transmission schemes. For example, when spatial diversity, i.e., transmission diversity, applies, transmission informations of the transmission signal vectors may be all the same. That is, $[s_1, s_2, \ldots, s_{nT}]$ may be all the same information, e.g., $[s_1, s_1, \ldots, s_1]$. Accordingly, since the same transmission informations are transferred to the receiver through different channels, a diversity effect occurs, and the transmission may be more reliable.

Or, when spatial multiplexing applies, the transmission informations of the transmission signal vectors may be different. That is, $s_1, s_2, \ldots, s_{nT}$ may be all different. Since different transmission informations are transmitted to the receiver through different channels, the amount of information to be transmitted may be increased.

Of course, transmission informations may be transmitted using both spatial diversity and spatial multiplexing. That is, in the above example, the same informations may be transmitted by spatial diversity through three transmission antennas, and different informations may be transmitted through spatial multiplexing through the remaining transmission antennas. In such case, the transmission information vectors may be configured as, e.g., $[s_1, s_1, s_1, s_2, s_3 \ldots, s_{nT-2}]$.

When the receiver has $N_R$ reception antennas, a signal received by an individual reception antenna may be represented as $y_n (1 \le n \le N_R)$. In this case, a reception signal vector y may be represented as in the following equation.

$$y = [y_1, y_2, \ldots, y_{N_R}]^T \quad \text{[Equation 6]}$$

When channel modeling is performed in a MIMO system, each channel may be differentiated from another by an index of a transmission antenna and an index of a reception antenna. When the index of the transmission antenna is j, and the index of the reception antenna is i, the channel between the transmission antenna and the reception antenna may be represented as $h_{ij}$. (it should be noted that the index of the reception antenna comes before the index of the transmission antenna in the subscript indicating the channel).

Figure 3:
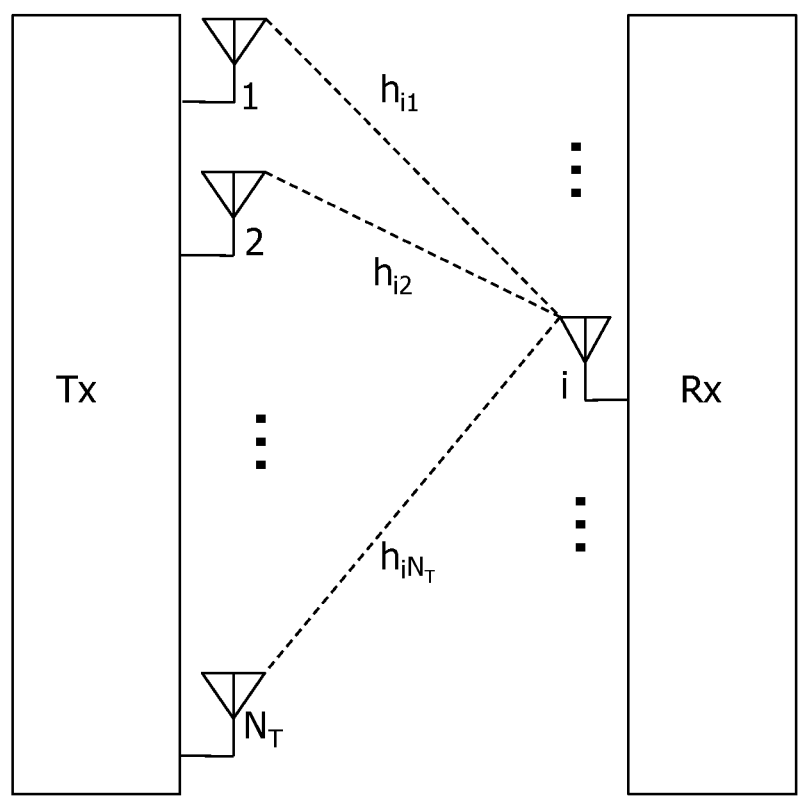
FIG. 3 illustrates an example of a channel in a multi-antenna system.

FIG. 3 illustrates an example of a channel in a multi-antenna system.

Referring to FIG. 3, channels for $N_T$ transmission antennas and reception antenna 1 are represented as $h_{i1}, h_{i2}, h_{iNT}$. For convenience, such channels may be represented in a matrix or vector. Then, the channels $h_{i1}, h_{i2}, \ldots, h_{iNT}$, may be represented in a vector form as follows.

$$h_i^T = [h_{i1}, h_{i2}, \ldots, h_{iN_T}] \quad \text{[Equation 7]}$$

When a matrix representing all the channels to $N_R$ in $N_T$ transmission antennas is channel matrix H, H may be represented as in Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

A signal transmitted through a transmission antenna passes through a channel as represented in Equation 8 and is then received by a reception antenna. In this case, the actual channel adds noise. The noise may be mathematically deemed an AWGN (Additive White Gaussian Noise). When AWGNs added to the reception antennas, respectively, are represented as $n_1, n_2, \ldots, n_{NR}$, the AWGNs may be represented as a vector as in the following equation.

$$n = [n_1, n_2, \ldots, n_{N_R}]^T \quad \text{[Equation 9]}$$

A reception signal vector y received by a reception antenna considering the above-described AWGN, transmission signal vector x, and channel matrix may be represented as in the following equation.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The numbers of rows and columns in the channel matrix H are determined depending on the numbers of transmission antennas and reception antennas. The number of rows in the channel matrix H is the same as the number of reception antennas. The number of columns in the channel matrix H is the same as the number of transmission antennas. Accordingly, the channel matrix H may be represented as a $N_R \times N_T$ matrix.

Generally, a rank of a matrix is defined by the smaller of the number of independent rows and the number of independent columns. Accordingly, the rank of matrix cannot be larger than the number of rows or the number of columns, and the rank of channel matrix H is determined as in the following equation.

$$\text{rank}(H) \le \min(N_T, N_R) \quad \text{[Equation 11]}$$

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 4:
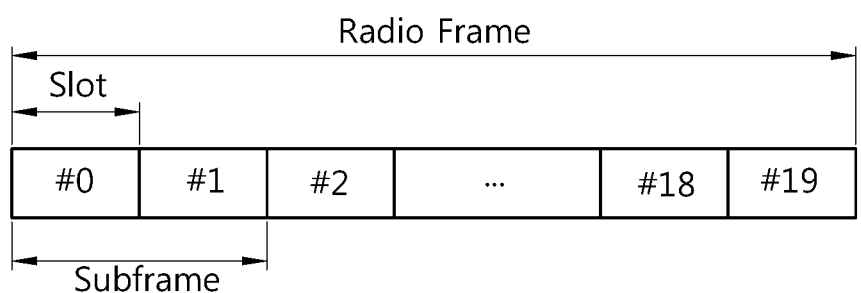
FIG. 4 illustrates the architecture of a radio frame according to frequency division duplex (FDD) in $3^{rd}$ generation partnership project (3GPP) long term evolution (LTE).

FIG. 4 illustrates the architecture of a radio frame according to FDD in 3GPP LTE.

Referring to FIG. 4, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 5:
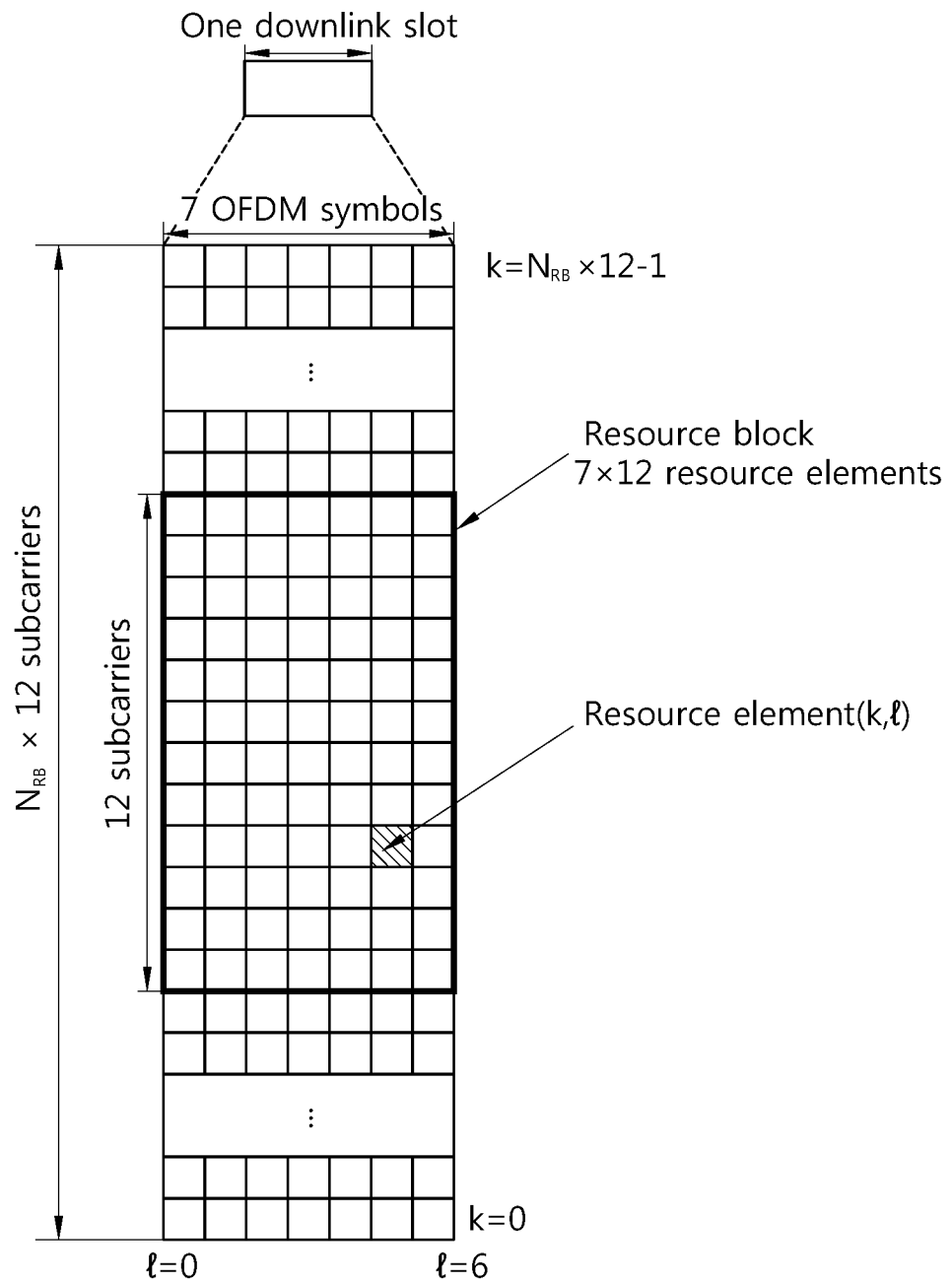
FIG. 5 illustrates an example resource grid for one uplink or downlink slot in 3GPP LTE.

FIG. 5 illustrates an example resource grid for one uplink or downlink slot in 3GPP LTE.

Referring to FIG. 5, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 6:
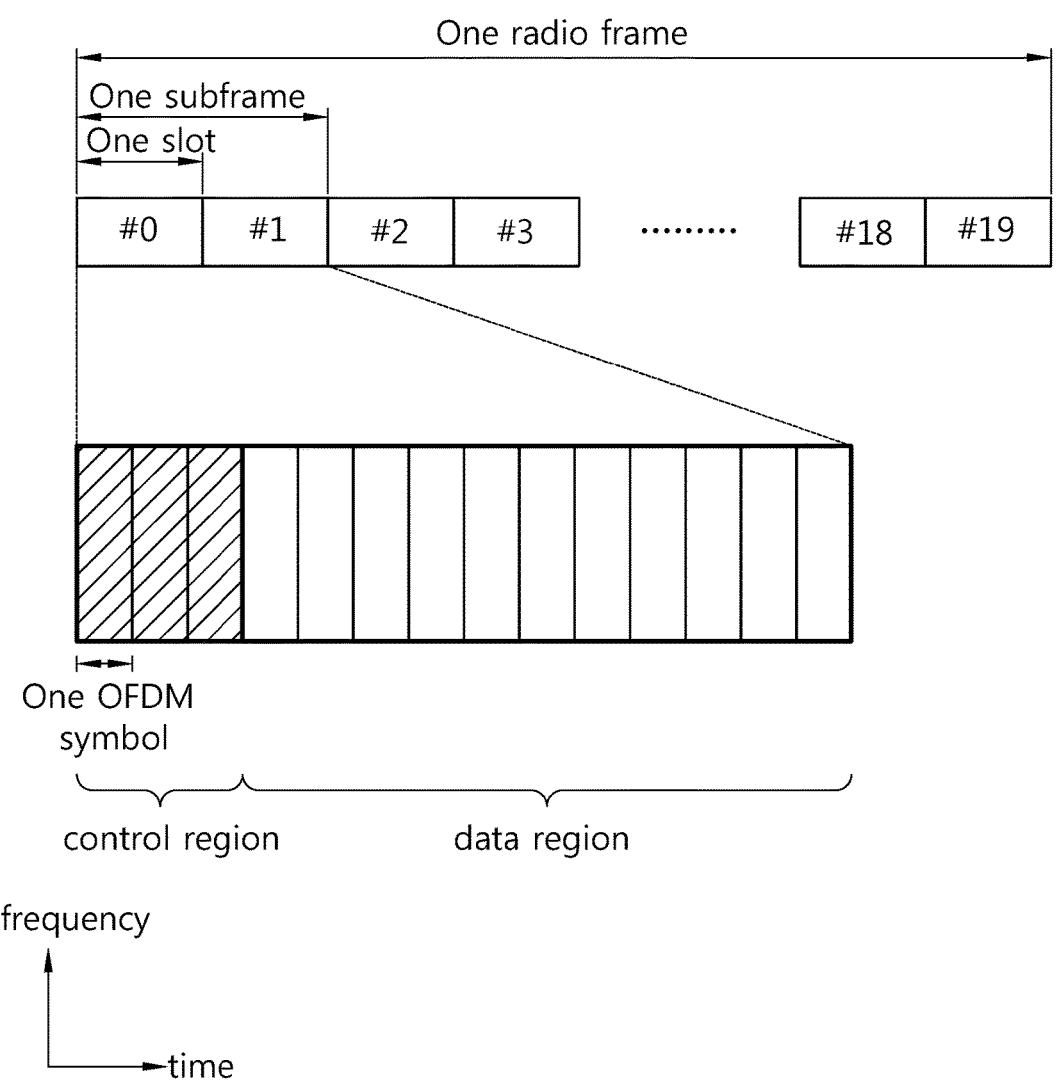
FIG. 6 illustrates the architecture of a downlink sub-frame.

FIG. 6 illustrates the architecture of a downlink sub-frame.

For this, 3GPP TS 36.211 V10.4.0 (2011 December) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 7:
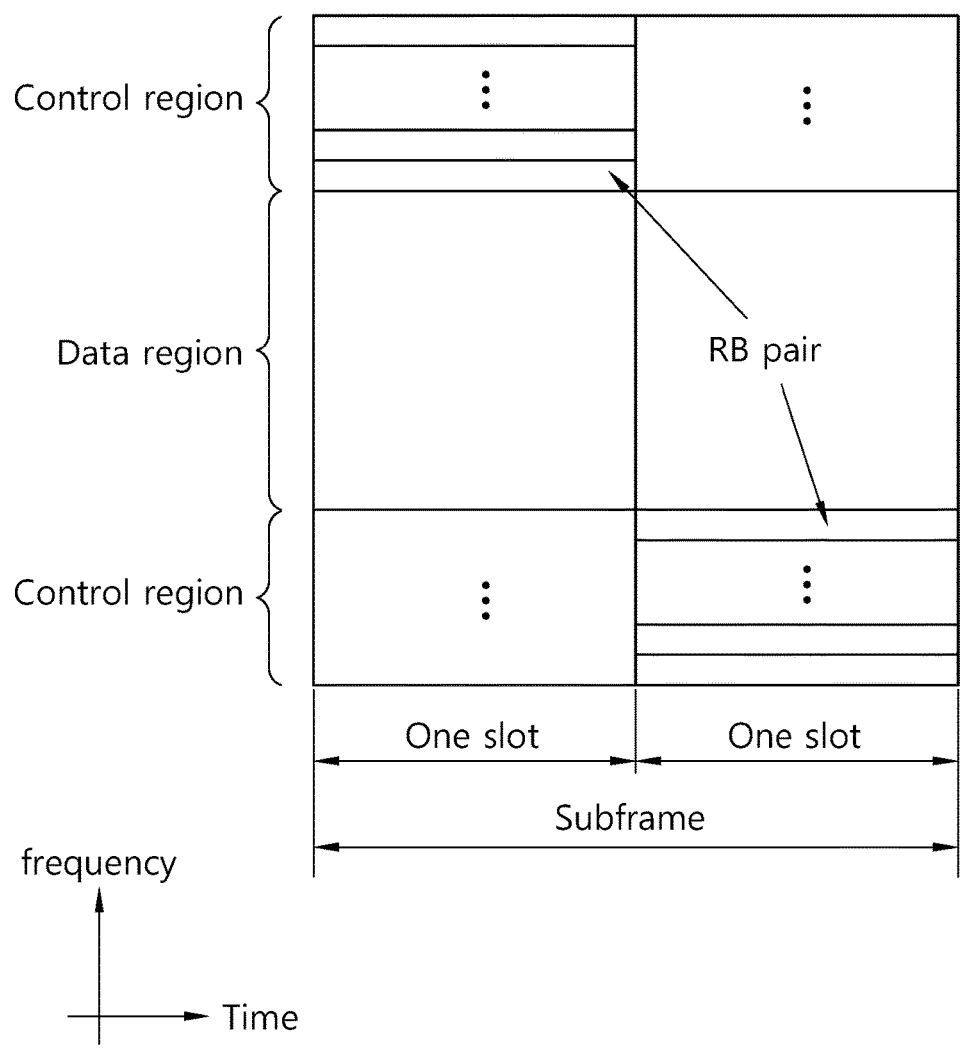
FIG. 7 illustrates the architecture of an uplink sub-frame in 3GPP LTE.

FIG. 7 illustrates the architecture of an uplink sub-frame in 3GPP LTE.

Referring to FIG. 7, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 8:
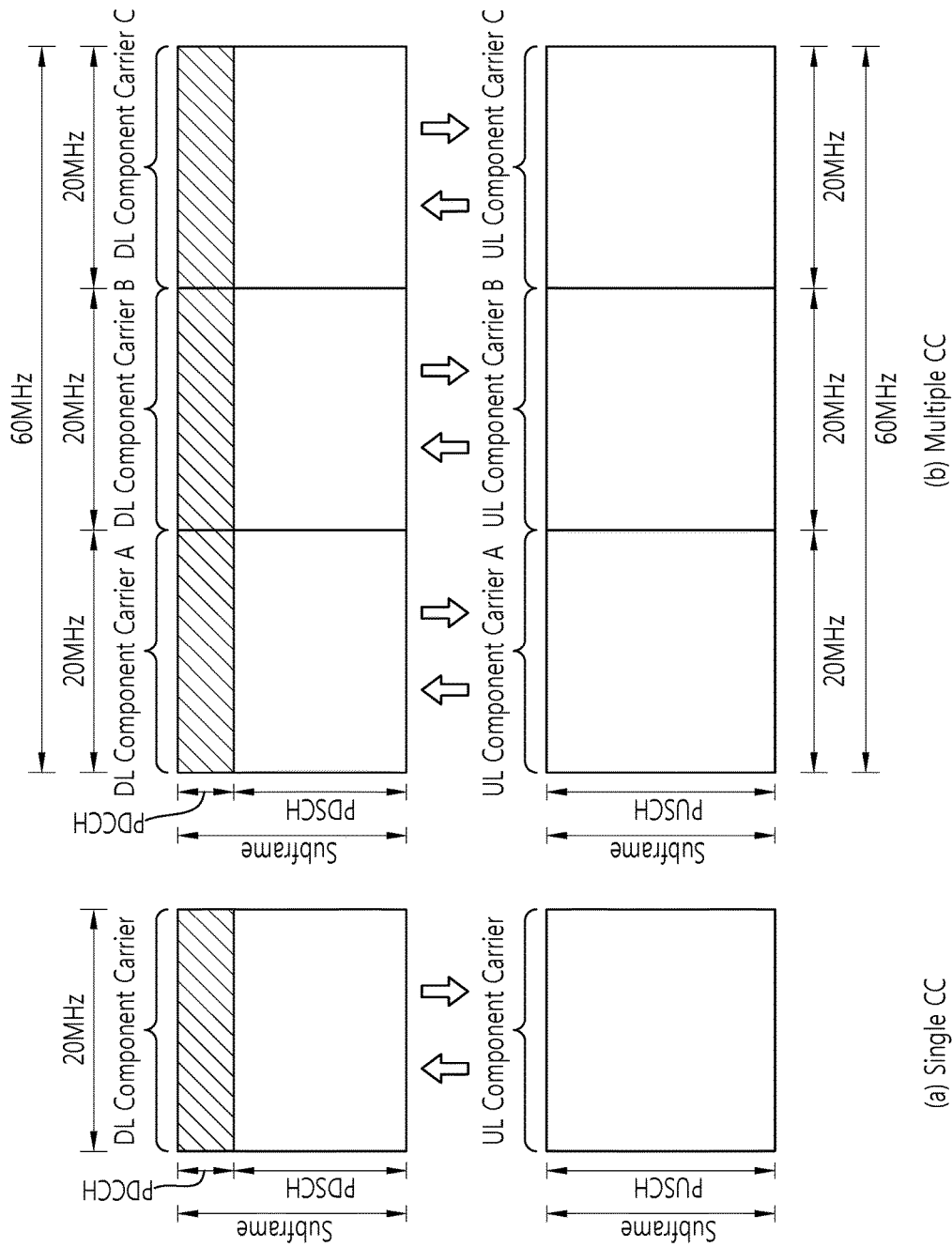
FIG. 8 illustrates an example of comparison between a single carrier system and a carrier aggregation system.

FIGS. 8a and 8b illustrate an example of comparison between a single carrier system and a carrier aggregation system.

Referring to FIG. 8a, a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 8a, data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 8b may correspond to a communication example in an LTE-A system.

Referring to FIG. 8b, in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 8b illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz(UL CC1)+20 MHz(UL CC2)+20 MHz(UL CC3)+5 MHz(UL CC4), for example. However, without consideration of backward compatibility, a new bandwidth may be defined rather the existing system bandwidth being used, to constitute a broadband.

FIG. 8b illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDCCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL FCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remains activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Meanwhile, the reference signal is hereinafter described.

Generally, transmission information, e.g., data, may be prone to be distorted or varied while transmitted through a wireless channel. Accordingly, a reference signal is required to demodulate the transmission information without errors. The reference signal is a signal previously known between the transmitter and the receiver and is transmitted together with transmission information. Since transmission information transmitted from the transmitter goes through a channel corresponding to each transmission antenna or layer, the reference signal may be allocated per transmission antenna or layer. The reference signal per transmission antenna or layer may be differentiated using resources, such as time, frequency, or code. The reference signal may be used for two purposes, i.e., demodulation and channel estimation of transmission information.

There may be two types of reference signals depending on the category of a receiver previously aware of a reference signal. The first reference signal is a reference signal that is known to only a particular receiver (e.g., a particular UE) and such reference signal is denoted a dedicated RS (DRS). The dedicated reference signal, in such meaning, is also referred to as a UE-specific RS. The second reference signal is a reference signal that is known to all the receivers in a cell, e.g., all the UEs, and such reference signal is denoted a common RS (CRS). The CRS is also denoted a cell-specific RS.

Further, reference signals may be classified depending on uses. For example, a reference signal used for data demodulation is denoted a demodulation RS (DM-RS). A reference signal used for feedback information indicating a channel state, such as CQI/PMI/RI, is denoted a CSI-RS (channel state indicator-RS). The DRS may be used, as a DM-RS. It is hereinafter assumed that the DM-RS is a DRS.

Figure 9A:
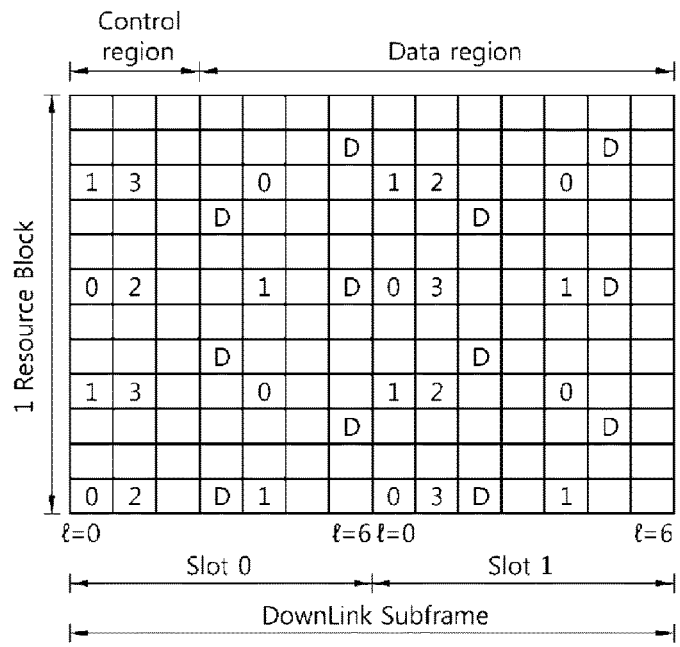
FIG. 9a illustrates an example of a reference signal (RS) structure that may support four antenna ports in normal cyclic prefix (CP).
Figure 9B:
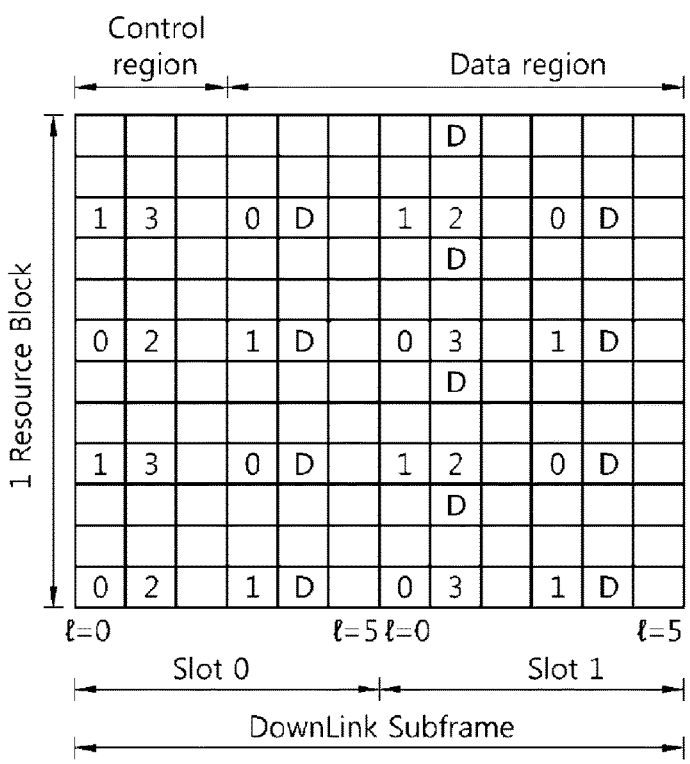
FIG. 9b illustrates an example of an RS structure that may support four antenna ports in extended CP.

FIG. 9a illustrates an example of an RS structure that may support four antenna ports in normal CP. FIG. 9b illustrates an example of an RS structure that may support four antenna ports in extended CP.

The RS structures of FIGS. 9a and 9b are RS structures used in a conventional 3GPP LTE system.

The resource element marked with one of 0 to 3 in FIGS. 9a and 9b denotes a resource element where a cell-specific reference signal, i.e., a common reference signal (CRS) is transmitted. Here, any one of 0 to 3 denotes a supported antenna port. That is, resource elements marked with p (p is any one of 0 to 3) mean resource elements to which a common reference signal for antenna port p is mapped. Such common reference signal is used to perform channel measurement and data demodulation on each antenna port. The common reference signal is transmitted in both the control region and the data region.

Resource elements marked with D in FIGS. 9a and 9b denote resource elements to which a UE-specific reference signal, i.e., a dedicated reference signal (DRS) is mapped. The UE-specific reference signal may be used single antenna port transmission of a PDSCH. The UE receives an indication as to whether a UE-specific reference signal is transmitted, and when a PDSCH is transmitted, whether the UE-specific reference signal is valid, through a higher layer signal. The UE-specific reference signal may be transmitted only when data demodulation is needed. The UE-specific reference signal may be transmitted only in the data region.

FIG. 10 illustrates an example of an RB to which a CSI-RS is mapped among reference signals.

A CSI-RS is used for channel measurement for generation of channel information and channel estimation on a PDSCH of an LTE-A UE. CSI-RSs are relatively sparsely arranged in the frequency region or time region, and may be punctured in the data region of a normal sub-frame or MBSFN sub-frame. When necessary through CSI estimation, CQI, PMI, and RI may be reported from the UE.

CSI-RSs are transmitted through one, two, four, or eight antenna ports. The antenna ports used here are p=15, p=15, 16, p=15, . . . , 18 and p=15, . . . , 22, respectively. That is, CSI-RSs may be transmitted through one, two, four, and eight antenna ports. See 3GPP(3rd Generation Partnership Project) TS 36.211 V10.1.0 (2011 March) "Technical Specification Group Radio Access Network; Evolved Universal Terrestrial Radio Access (E-UTRA); Physical channels and modulation (Release 8)," Ch. 6.10.5 for the CSI-RS.

In transmission of a CSI-RS, up to 32 different configurations may be proposed to reduce inter-cell interference (ICI) in a multi-cell environment including a heterogeneous network (HetNet) environment. The configuration of the CSI-RS may be varied depending on the number of antenna ports in the cell and CP, and a neighboring cell may have a configuration as different as possible. Further, CSI-RS configurations may be divided depending on the frame structure into ones applied to both the FDD frame and TDD frame and ones applied only to the TDD frame. A plurality of CSI-RS configurations in one cell may be used. Zero or one CSI-RS configuration for UEs assuming non-zero power CSI-RSs and 0 or several CSI-RS configurations for UEs assuming zero power CSI-RSs may come in use.

The CSI-RS configurations may be indicated by a higher layer. For example, a CSI-RS-Config IE (information element) transmitted through a higher layer may indicate a CSI-RS configuration. Table 1 shows an example of CSI-RS-Config IE.

TABLE 1

| | | |
|---|---|---|
| CSI-RS-Config-r10 ::= | SEQUENCE { | |
| csi-RS-r10 | CHOICE { | |
| release | NULL, | |
| setup | SEQUENCE { | |
| antennaPortsCount-r10 | ENUMERATED {an1, an2, an4, an8}, | |
| resourceConfig-r10 | INTEGER (0..31), | |
| subframeConfig-r10 | INTEGER (0..154), | |
| p-C-r10 | INTEGER (−8..15) | |
| } | | |
| } | OPTIONAL, | -- Need ON |
| zeroTxPowerCSI-RS-r10 | CHOICE { | |
| release | NULL, | |
| setup | SEQUENCE { | |

TABLE 1-continued

```
zeroTxPowerResourceConfigList-r10    BIT STRING (SIZE (16)),
zeroTxPowerSubframeConfig-r10        INTEGER (0..154)
}
}
}                                    OPTIONAL              -- Need ON
}
-- ASN1STOP
```

Referring to Table 1, the 'antennaPortsCount' field indicates the number of antenna ports used for transmission of a CSI-RS. The 'resourceConfig' field indicates a CSI-RS configuration. The 'SubframeConfig' field and 'zeroTxPowerSubframeConfig' field indicate sub-frame configurations where a CSI-RS is transmitted.

The 'zeroTxPowerResourceConfigList' field indicates a zero-power CSI-RS configuration. The CSI-RS configurations corresponding to bits set to 1's in the bitmap of 16 bits constituting the 'zeroTxPowerResourceConfigList' field may be set as zero-power CSI-RSs.

A sequence $r_{l,n_s}(m)$ for CSI-RS may be generated as in the following equation.

$$r_{l,n_s}(m) = \frac{1}{\sqrt{2}}(1 - 2\cdot c(2m)) + j\frac{1}{\sqrt{2}}(1 - 2\cdot c(2m+1)), \quad \text{[Equation 12]}$$

$$m = 0, \ldots, N_{RB}^{max,DL} - 1$$

where, $$c_{init} = 2^{10}\cdot(7\cdot(n_s+1) + l + 1)\cdot(2\cdot N_{ID}^{cell} + 1) + 2\cdot N_{ID}^{cell} + N_{CP}$$

$$N_{CP} = \begin{cases} 1 & \text{for normal } CP \\ 0 & \text{for extended } CP \end{cases}$$

In Equation 12, $n_s$ is a slot number in the radio frame, and $l$ is an OFDM symbol number in the slot. $c(i)$ is a pseudo random sequence and is started at each OFDM symbol with $c_{init}$ indicated in Equation 1. $N_{ID}^{cell}$ means a physical cell ID.

In sub-frames configured to transmit CSI-RSs, the reference signal sequence $r_{l,n_s}(m)$ is mapped to a complex value modulation symbol $a_{k,l}^{(p)}$ used as a reference symbol for antenna port p.

The relationship between $r_{l,n_s}(m)$ and $a_{k,l}^{(p)}$ is given as in the following equation.

$$a_{k,l}^{(p)} = w_{l''}\cdot r(m') \quad \text{[Equation 13]}$$

where, $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l'' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 13, (k', l') and $n_s$ are given in Tables 2 and 3 described below. A CSI-RS may be transmitted in a downlink slot where ($n_s$ mod 2) meets the conditions in Tables 2 and 3 to be described below (where, 'mod' means modular computation. That is, ($n_s$ mod 2) means the remainder obtained by dividing $n_s$ by 2).

Table 2 represents a CSI-RS configuration in normal CP, and Table 3 represents a CSI-RS configuration in extended CP.

TABLE 2

| | | Number of configured CSI-RSs | | | | | |
|---|---|---|---|---|---|---|---|
| | | 1 or 2 | | 4 | | 8 | |
| CSI-RS | configuration index | (k', l') | $n_s$ mod 2 | (k', l') | $n_s$ mod 2 | (k', l') | $n_s$ mod 2 |
| TDD and FDD frames | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |

TABLE 2-continued

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frames | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

The UE may transmit CSI-RSs only in the downlink slot meeting the condition of ns mod 2 in Tables 2 and 3. Further, the UE abstains from transmitting CSI-RSs in a special sub-frame of a TDD frame, a sub-frame where CSI-RS transmission collides with a synchronization signal, PBCH (physical broadcast channel), and system information block type 1 (SystemInformationBlockType1) or a sub-frame where a paging message is transmitted. Further, in a set S, where S={15}, S={15, 16}, S={17, 18}, S={19, 20} or S={21, 22}, a resource element where a CSI-RS of one antenna port is transmitted is not used for transmission of a CSI-RS of another antenna port.

Table 4 shows an example of a configuration of a sub-frame where a CSI-RS is transmitted.

TABLE 4

| CSI-RS-SubframeConfig $I_{CSI-RS}$ | CSI-RS period $T_{CSI-RS}$ (sub-frame) | CSI-RS sub-frame offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 4, depending on the CSI-RS sub-frame configuration ($I_{CSI-RS}$), the period ($T_{CSI-RS}$) of the sub-frame where CSI-RSs are transmitted and an offset ($\Delta_{CSI-RS}$) may be determined. The CSI-RS sub-frame configuration in Table 4 may be one of the 'SubframeConfig' field or 'ZeroTxPowerSubframeConfig' field of the CSI-RS-Config IE in Table 1. The CSI-RS sub-frame configuration may be separately made for non-zero power CSI-RSs and zero power CSI-RSs.

Meanwhile, FIG. 10 illustrates resource elements used for CSI-RSs when the CSI-RS configuration index is 0 in normal CP. Rp denotes a resource element used for CSI-RS transmission on antenna port p. Referring to FIG. 11, CSI-RSs for antenna ports 15 and 16 are transmitted through the resource elements corresponding to the third subcarriers (subcarrier index 2) of the sixth and seventh OFDM symbols (OFDM symbol indexes 5 and 6) of the first slot. The CSI-RSs for antenna ports 17 and 18 are transmitted through resource elements corresponding to the ninth subcarriers (subcarrier index 8) of the sixth and seventh OFDM symbols (OFDM symbol indexes 5 and 6) of the first slot. The CSI-RSs for antenna ports 19 and 20 are transmitted through the same resource element where the CSI-RSs for antenna ports 15 and 16 are transmitted, and the CSI-RSs for antenna ports 21 and 22 are transmitted through the same resource element where the CSI-RSs for antenna ports 17 and 18 are transmitted.

When CSI-RSs are transmitted to the UE through eight antenna ports, the UE will receive RBs to which R15 to R22 are mapped. That is, the UE will receive a CSI-RS having a particular pattern.

<Inter-cell Interference>

Meanwhile, inter-cell interference issues and their solutions are hereinafter described.

The inter-cell interference refers to a case where interference occurs between cells when coverage is overlapped between the cells in order to remove a shadow area.

Such an inter-cell interference problem also occurs between a CSI-RS and a PDSCH.

Figure 11A:
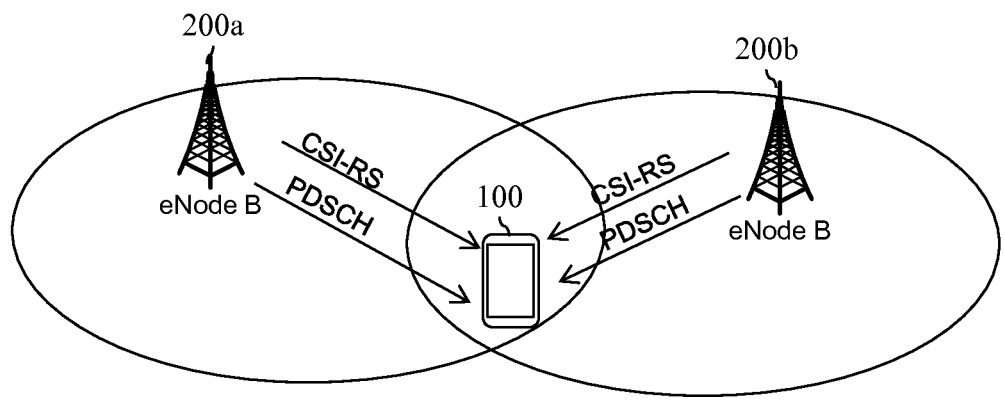
FIGS. 11a and 11b illustrate an example of a situation in which interference is caused by a CSI-RS from a neighbor cell.
Figure 11B:
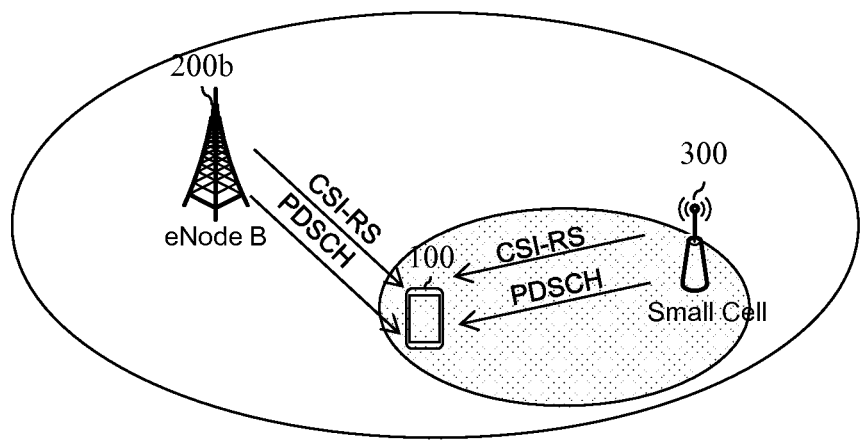

FIG. 11 and FIG. 11b illustrate an example of a situation in which interference is caused by a CSI-RS from a neighbor cell.

Referring to FIG. 11a, it is shown a situation in which a serving cell of a UE 100 is a 1$^{st}$ eNodeB 200a, and a neighbor cell causing interference is a 2$^{nd}$ eNodeB 200b. When the 2$^{nd}$ eNodeB 200b as the neighbor cell causing the interference transmits the CSI-RS, the CSI-RS may cause interference to a PDSCH from the 1$^{St}$ eNodeB 200a as the serving cell.

Meanwhile, recently, there is an ongoing discussion on a heterogeneous network in which a macro cell and a small cell (e.g. a pico cell, a femto cell, or a micro cell) co-exist. In particular, there is an ongoing discussion for traffic offloading by distributing UEs connected to the macro cell to the small cell.

Referring to FIG. 11b, it is shown an example in which a small cell 300 exists in an overlapping manner in the coverage of a 2$^{nd}$ eNodeB 200b as a macro cell. In the present specification, the macro cell and a macro eNodeB may be used together. A UE connected to the macro cell may be referred to as a macro UE.

As such, the heterogeneous network has an inter-cell interference problem since the macro cell and the small cell overlap. For example, as illustrated, it is assumed that a serving cell of the UE 100 is the small cell 300, and a neighbor cell causing interference is the 2$^{nd}$ eNodeB 200b corresponding to the macro cell. In this situation, if the 2$^{nd}$ eNodeB 200b causing interference transmits a CSI-RS, the CSI-RS may cause interference to a PDSCH from the small cell 300 corresponding to the serving cell.

FIG. 12 illustrates an example in which resources are allocated to avoid interference caused by a CSI-RS between cells.

A grid of a downlink subframe based on a serving cell is illustrated in an upper side of FIG. 12, and a grid of a downlink subframe based on a neighbor cell is illustrated in a lower side thereof.

Referring to the upper side of FIG. 12, the serving cell may allocate a non-zero power (NZP) CSI-RS resource. A zero power (ZP) CSI-RS resource may be selectively allocated. Likewise, referring to the lower side of FIG. 12, the neighbor cell may allocate the NZP CSI-RS resource. The ZP CSI-RS resource may be selectively allocated.

Comparing the upper side and lower side of FIG. 12, if the serving cell transmits a CSI-RS at a location of an NZP resource element (RE), the neighbor cell allocates the ZP CSI-RS at the same location, thereby decreasing interference caused by the CSI-RS between the serving cell and the neighbor cell. Likewise, if the neighbor cell transmits the CSI-RS at a location of the NZP resource RE, the serving cell allocates the ZP CSI-RS at the same location, thereby decreasing interference caused by the CSI-RS between the serving cell and the neighbor cell. With the decrease in the interference, channel estimation performance of a UE can be more improved.

Figure 13A:
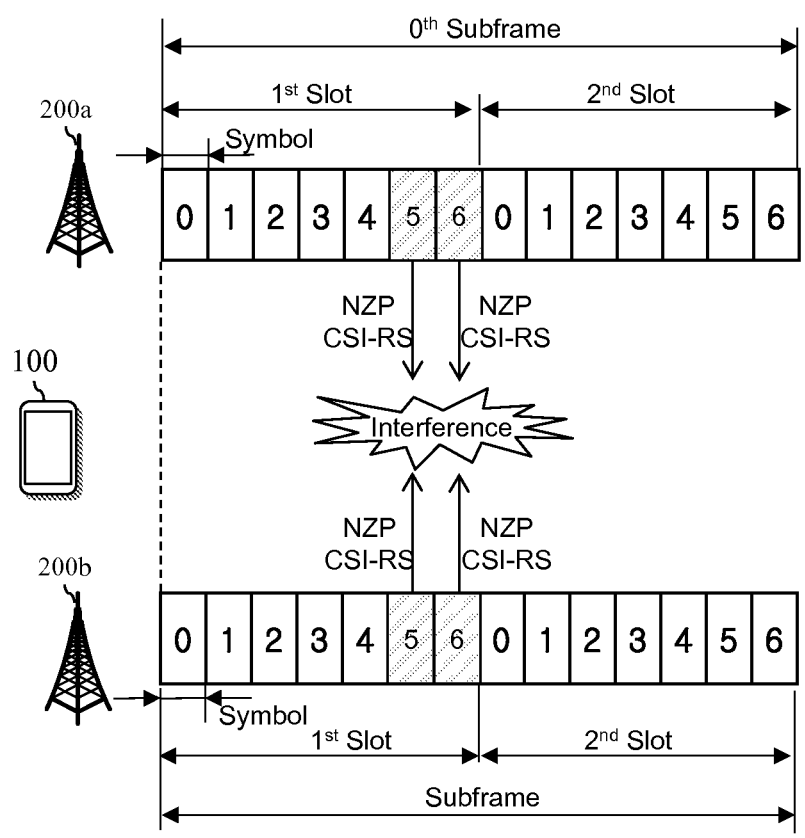
FIG. 13a illustrates an example of mutual interference caused by a CSI-RS between cells.
Figure 13B:
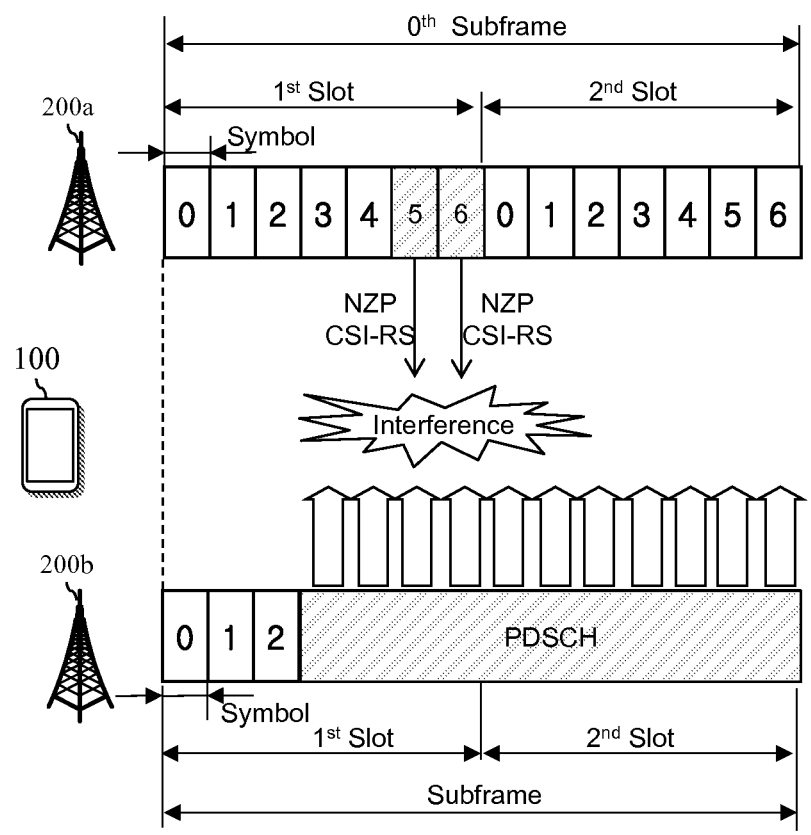
FIG. 13b and FIG. 13c illustrate examples in which a CSI-RS and a PDSCH interfer with each other between cells.
Figure 13C:
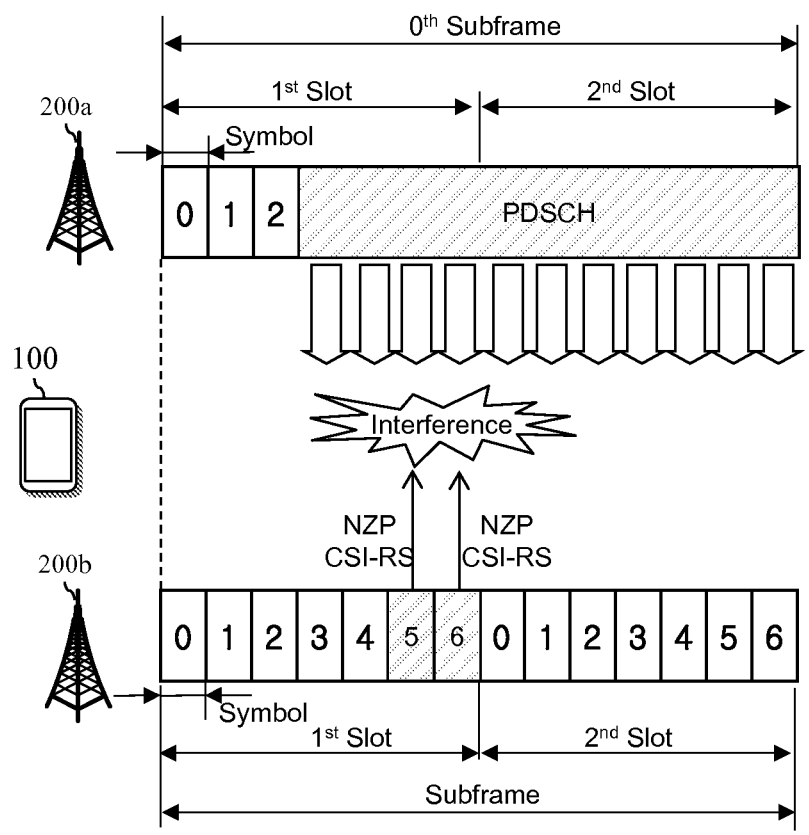

FIG. 13a illustrates an example of mutual interference caused by a CSI-RS between cells, and FIG. 13b and FIG. 13c illustrate examples in which a CSI-RS and a PDSCH interfer with each other between cells.

As can be seen with reference to FIG. 13a, when a serving cell 200a transmits a CSI-RS at a location of an NZP RE, if a neighbor cell 200b does not allocate a ZP CSI-RS but allocates an NZP CSI-RS, a UE 100 is interfered by the NZP CSI-RS of the neighbor cell 200b when intended to receive a CSI-RS from the serving cell 200a.

Since the NZP CSI-RS is allocated basically by avoiding collision between the serving cell and the neighbor cell, the situation illustrated in FIG. 13a rarely occurs. However, a possibility of occurrence of such a situation cannot be excluded if a small cell or a remote radio head (RRH) is densely deployed in a macro cell.

In addition, as can be seen with reference to FIG. 13b, when a serving cell 200a transmits a CSI-RS at a location of an NZP RE, if a neighbor cell 200b does not allocate a ZP CSI-RS but allocates a PDSCH, a UE 100 is interfered by the PDSCH of the neighbor cell 200b when intended to receive a CSI-RS from the serving cell 200a.

On the contrary, as can be seen with reference to FIG. 13c, when a neighbor cell 200b transmits a CSI-RS at a location of an NZP RE, if a serving cell 200a does not allocate the ZP CSI-RS but allocates a PDSCH, a UE 100 is interfered by the CSI-RS of the neighbor cell 200b when intended to receive the PDSCH form the serving cell 200a.

Accordingly, one disclosure of the present specification proposes a method of allowing a UE to remove interference caused by a neighbor cell's CSI-RS or PDSCH in order to increase performance of serving cell's CSI-RS channel estimation and PDSCH reception.

Hereinafter, a method of adding an interference cancellation capability to a UE will be described.

Figure 14A:
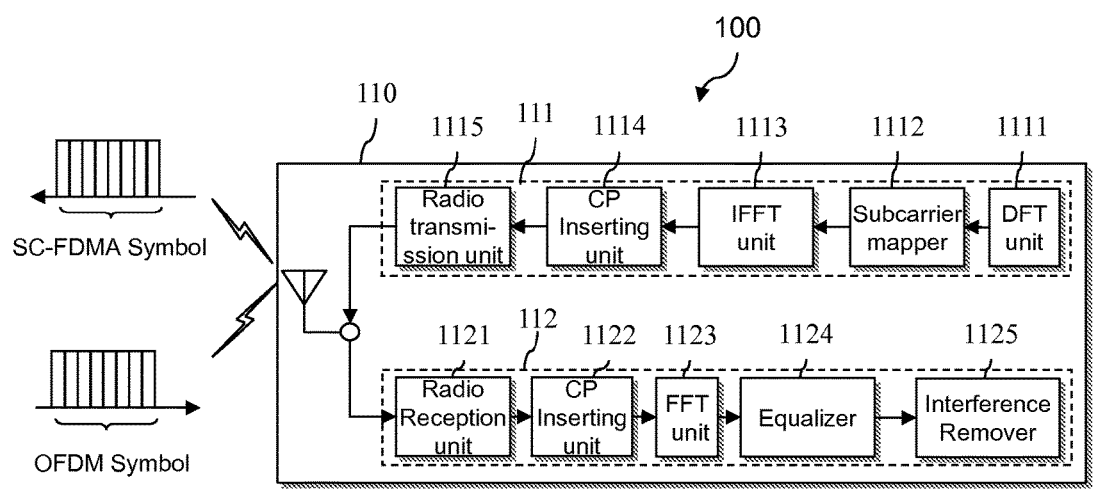
FIG. 14a is a block diagram illustrating the structure of user equipment (UE) according to one disclosure of the present specification.

FIG. 14a is a block diagram illustrating the structure of UE according to one embodiment of the present specification.

In LTE or LTE-A, OFDM is used for a downlink and SC-FDMA similar to OFDM is used for an uplink.

SC-FDMA may also be referred to as discrete Fourier transform (DFT)-spread OFDM (DFT-s OFDM). When SC- is used, non-linear distortion of a power amplifier may be avoided, thus improving transmission power efficiency in a power consumption-limited terminal. Accordingly, user throughput may be enhanced.

SC-FDMA is substantially similar to OFDM in that SC-FDMA transmits signals via separate subcarriers using a Fast Fourier transform (FFT) and inverse FFT (IFFT). A conventional OFDM transmitter has a problem that signals in respective subcarriers on the frequency axis are converted into signals on the time axis by IFFT. That is, IFFT is a scheme of performing the same operation in parallel, and thus peak-to-average power ratio (PAPR) increases. To prevent increase in PAPR, SC-FDMA performs IFFT after DFT spreading, unlike OFDM. That is, a transmission mode in which IFFT is performed after DFT spreading is defined as SC-FDMA. Further, SC-FDMA is also referred to as DFT spread OFDM (DFT-s-OFDM).

SC-FDMA secures robustness to a multipath channel due to a similar structure to OFDM and basically resolves a disadvantage of conventional OFDM that is increase in PAPR by IFFT, thereby allowing efficient use of a power amplifier.

Referring to FIG. 14a, the UE 100 includes a radio frequency (RF) unit 110. The RF unit 110 includes a transmitter 111 and a receiver 112. The transmitter 111 includes a discrete Fourier transform (DFT) unit 1111, a subcarrier mapper 1112, an IFFT unit 1113, a cyclic prefix (CP) insertion unit 1114, and a wireless transmission unit 1115. The transmitter 111 of the RF unit 110 may further include, for example, a scramble unit, a modulation mapper, a layer mapper, and a layer permutator, which may be disposed before the DFT unit 1111. That is, as described above, to prevent increase in PAPR, the transmitter of the RF unit 110 subjects data to the DFT unit 1111 before mapping a signal to a subcarrier. The signal spread (or precoded) by the DFT unit 1111 is mapped onto a subcarrier by the subcarrier mapper 1112 and subjected to the IFFT unit 1113 into a signal on the time axis.

That is, in SC-FDMA, unlike OFDM, PAPR of a signal in the time domain obtained via the IFFT unit 1113 is not substantially increased by correlations between the DFT unit 1111, the subcarrier mapper 1112, and the IFFT unit 1113, thereby providing favorable transmission power efficiency. That is, in SC-FDMA, PAPR or cubic meter (CM) may be decreased.

The DFT unit 1111 performs DFT on input symbols to output complex-valued symbols. For example, when Ntx symbols are input (here, Ntx is a natural number), DFT has a size of Ntx. The DFT unit 1111 may be referred to as a transform precoder. The subcarrier mapper 1112 maps the complex-valued symbols onto respective subcarriers in the frequency domain. The complex-valued symbols may be mapped onto resource elements corresponding to resource blocks allocated for data transmission. The subcarrier mapper 1112 may be referred to as a resource element mapper. The IFFT unit 1113 performs IFFT on the input symbols to output a baseband signal for data as a signal in the time domain. The CP insertion unit 1114 copies latter part of the baseband signal for data and inserts the latter part in front of the baseband signal for data. CP insertion prevents inter-symbol interference (ISI) and inter-carrier interference (ICI), thereby maintaining orthogonality even in a multipath channel.

Meanwhile, the 3GPP is actively carrying out standardization of LTE-Advanced, evolving from LTE, for which clustered DFT-s-OFDM allowing non-contiguous resource allocation is adopted.

Clustered DFT-s-OFDM is a modification of existing SC-FDMA, which divides data symbols having been subjected to a precoder into a plurality of sub-blocks and separately mapping the sub-blocks in the frequency domain. An important feature of clustered DFT-s-OFDM allows frequency selective resource allocation to deal with a frequency selective fading environment in a flexible manner.

Here, clustered DFT-s-OFDM adopted as an uplink access mode for LTE-Advanced allows non-contiguous resource allocation, unlike SC-FDMA as an uplink access for LTE, and thus transmitted uplink data may be divided into a plurality of cluster units.

That is, the LTE system is configured to maintain a single carrier characteristic in an uplink, whereas the LTE-A system allows non-contiguous allocation of DFT-precoded data to the frequency axis or simultaneous transmissions of a PUSCH and PUCCH.

Meanwhile, the receiver 112 of the RF unit 110 includes a wireless reception unit 1121, a CP cancellation unit 1122, an FFT unit 1123, an equalizer unit 1124, and an interference cancellation unit 1125. The wireless reception unit 1121, the CP cancellation unit 1122, and the FFT unit 1123 of the receiver perform reverse functions of the wireless transmission unit 1115, the CP insertion unit 1114, and the IFFT unit 1113 of the transmitter 111.

The interference cancellation unit 1125 cancels or relieves interference included in a received signal.

The interference cancellation unit 1125 is added for dealing with an explosively increasing demand for radio data and for canceling interference.

Figure 14B:
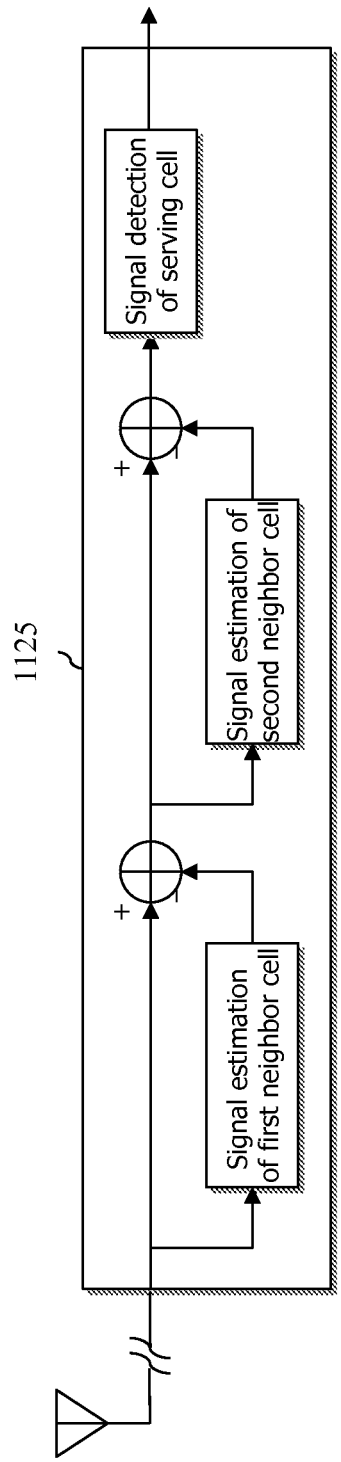

FIG. 14b is a block diagram illustrating operations of the interference cancellation unit shown in FIG. 14a.

The receiver 112 additionally including the interference cancellation unit 1125, which is called an interference cancellation (IC) receiver or interference rejection combiner (IRC) receiver, is configured to subtract an interference signal from a received signal.

Here, complexity of the receiver additionally including the interference cancellation unit 1125 depends on a maximum number of cells as an interference cancellation target and kinds of signals to be cancelled. FIG. 14b illustrates operations of performing interference cancellation of up to two interference sources.

However, if the interference cancellation target is a PDSCH, the UE 100 must perform blind decoding on all RBs, which may lead to a significant increase in a computation amount. In particular, the UE cannot know whether the interference cancellation target is a neighbor cell's CSI-RS or PDSCH, thereby having a problem in that blind decoding is always performed.

However, if information regarding the neighbor cell's NZP CSI-RS and PDSCH is signaled by the serving cell to the UE, the UE can more effectively interfere with the neighbor cell's NZP CSI-RS and PDSCH. In addition, as a result, since the UE can remove the interference, the serving cell can allocate the PDSCH on an RE in which the neighbor cell's NZP CSI-RS is transmitted. Therefore, an overhead caused by the CSI-RS can be decreased, and a resource can be used more effectively.

Accordingly, another disclosure of the present specification proposes a method of transmitting a network signal to a UE so that the UE can effectively remove interference on a CSI-RS or PDSCH from a neighbor cell, in order to improve performance of serving cell's channel estimation and PDSCH reception.

Figure 15:
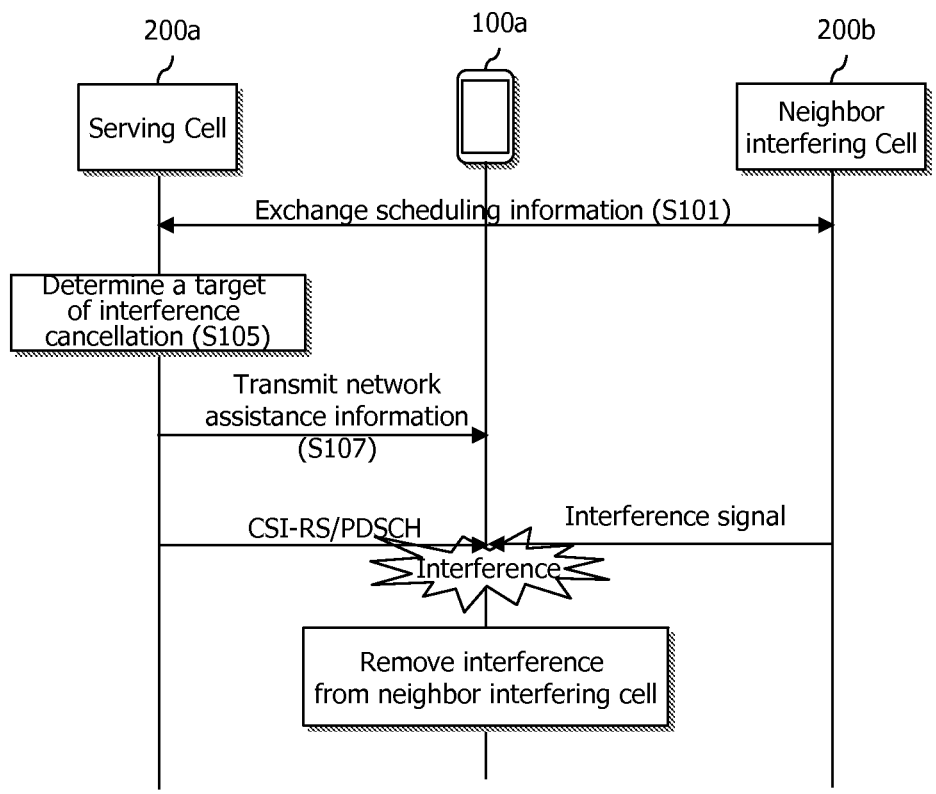
FIG. 15 illustrates a signal flow according to an embodiment of the present specification.

FIG. 15 illustrates a signal flow according to an embodiment of the present specification.

As can be seen with reference to FIG. 15, a serving cell 200a exchanges scheduling information with a neighbor interfering cell 200b (S101).

Next, the serving cell 200a determines whether a neighbor interfering cell's signal causing interference to any one of a CSI-RS and PDSCH of the serving cell 200a is the CSI-RS or the PDSCH according to the scheduling information. That is, the serving cell 200a determines an interference cancellation target of the UE (S105).

Next, the serving cell 200a transmits network assistance information including information regarding the interference cancellation target to the UE 100 (S107).

Then, the UE 100 can remove interference from the neighbor interfering cell 200b by using the network assistance information when receiving any one of the CSI-RS and the PDSCH from the serving cell 200a. More specifically, on the basis of the network assistance information, the UE 100 encodes a signal of the neighbor interfering cell 200b as the interference cancellation target, for example, the CSI-RS or the PDSCH, and re-generates the signal of the neighbor interfering cell 200b by using a channel estimation result. Next, the UE 100 removes interference caused by the signal of the neighbor interfering cell 200b by using the re-generated signal of the neighbor interfering cell 200b, and thus acquires the CSI-RS or the PDSCH of the serving cell 200a.

Hereinafter, information regarding the interference cancellation target and included in the network assistance information will be described in greater detail.

First, as illustrated in FIG. 13b, if the CSI-RS of the serving cell 200b is interfered by the PDSCH of the neighbor cell 200b, the information regarding the interference cancellation target may include PDSCH transmission power based on the neighbor cell, a modulation and coding scheme (MCS), a transmission mode, the number of layers, a pre-coding matrix indication (PMI), and scrambling code seed information.

In case of FIG. 13a and FIG. 13c, the interference cancellation target is a neighbor cell's NZP CSI-RS. Therefore, the information regarding the interference cancellation target may include information regarding the neighbor cell's NZP CSI-RS, for example, the number of antenna ports, resource configuration information regarding the CSI-RS (i.e., neighresourceConfig), subframe configuration information regarding the CSI-RS (i.e., neighsubframeConfig), a scrambling code seed, and a power ratio between the PDSCH and the CSI-RS (e.g., p-C). The information regarding the neighbor cell's NZP CSI-RS is summarized by the following table.

TABLE 5

| Neigh-CSI-RS-ConfigNZP-r12 ::= | SEQUENCE { |
| neighantennaPortsCount-r11 | ENUMERATED {an1, an2, an4, an8}, |
| neighresourceConfig-r11 | INTEGER (0..31), |
| neighsubframeConfig-r11 | INTEGER (0..154), |
| neighscramblingIdentity-r11 | INTEGER (0..503), |
| } | |

The information regarding the neighbor cell's NZP CSI-RS may be delivered to all UEs in the serving cell. When the UE 100 receives such information, interference caused by the neighbor cell's NZP CSI-RS can be removed with low complexity. Therefore, reception performance and channel estimation performance of the UE can be improved.

However, if a traffic load is high, transmission of the information regarding the interference cancellation target by the serving cell to the UE may also become a load. Therefore, whether to perform transmission may be determined according to the traffic load.

Figure 16:
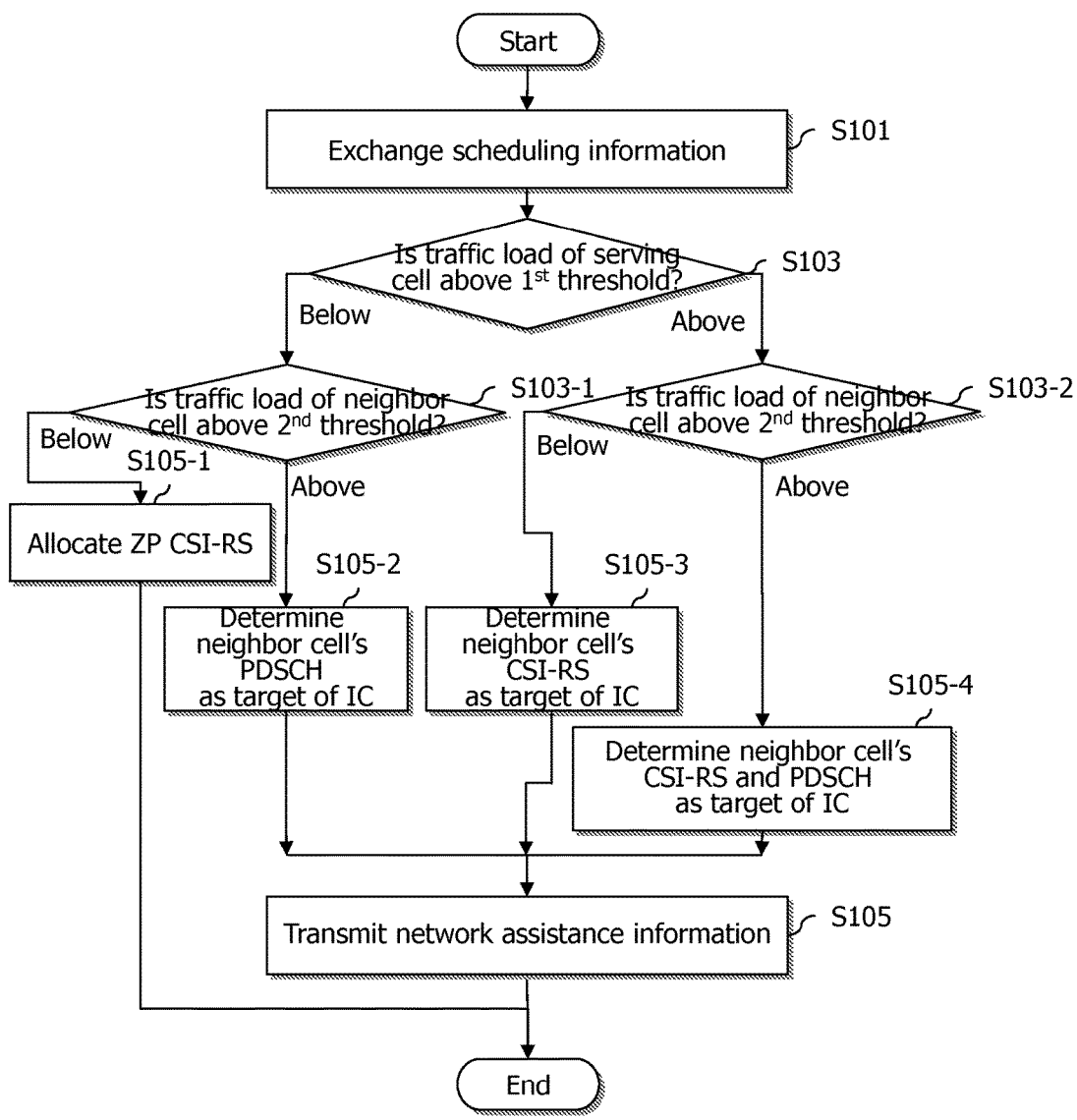
FIG. 16 is a flowchart illustrating a method of a serving cell according to an embodiment of the present specification.

FIG. 16 is a flowchart illustrating a method of a serving cell according to an embodiment of the present specification.

As described above, the serving cell 200a exchanges scheduling information with the neighbor interfering cell 200b (S101).

Next, in order to determine whether an interference cancellation target of a UE is a CSI-Rs or a PDSCH according to the scheduling information, the serving cell 200a first determines whether a traffic load of the serving cell is above a first threshold (S103). If the traffic load of the serving cell is below the first threshold, the serving cell 200a determines whether a traffic load of the neighbor cell is above a second threshold (S103-1). Likewise, if the traffic load of the serving cell is above the first threshold, the serving cell 200a determines whether the traffic load of the neighbor cell is above the second threshold (S103-2).

If the traffic load of the serving cell is below the first threshold and the traffic load of the neighbor cell is also below the second threshold, the serving cell 200a determines the interference cancellation target of the UE as null. The serving cell 200a allocates a ZP CSI-RS to a neighbor cell's NZP CSI-RS resource location (S105-1), and ends the procedure without transmission of the network assistance information. In this case, since the network assistance information is not received, the UE 100 does not perform an interference cancellation operation.

However, if the traffic load of the serving cell is below the first threshold but the traffic load of the neighbor cell is above the second threshold, the serving cell 200a determines the neighbor cell's PDSCH as the interference cancellation target (S105-2), and transmits the network assistance information including the information regarding the neighbor cell's PDSCH to the UE 100 (S105). In this case, the UE 100 may determine whether to perform the interference cancellation operation according to a size of interference of the neighbor cell regarding the NZP CSI-RS of the serving cell 200a, and may perform the interference cancellation operation according to the determination. For example, in case of serving cell signal power−interference power>z[dB], the UE 100 may not perform the interference cancellation operation. However, in case of serving cell signal power−interference power<z[dB], the UE 100 may perform the interference cancellation operation.

On the other hand, if the traffic load of the serving cell is above the first threshold and the traffic load of the neighbor cell is below the second threshold, the serving cell 200a determines the neighbor cell's NZP CSI-RS as the interference cancellation target (S105-3), and transmits the network assistance information including the neighbor cell's NZP CSI-RS to the UE 100 (S105). Then, the UE 100 may determine whether to perform the interference cancellation operation according to a size of interference caused by the neighbor cell's NZP CSI-RS, and may perform the interference cancellation operation by using the information regarding the neighbor cell's NZP CSI-RS according to the determination.

However, if the traffic load of the serving cell is above the first threshold and the traffic load of the neighbor cell is also above the second threshold, the serving cell 200a determines the neighbor cell's NZP CSI-RS and PDSCH as the interference cancellation target (S105-4), and transmits the network assistance information including information regarding the neighbor cell's NZP CSI-RS and PDSCH to the UE 100 (S105). Then, the UE 100 may determine whether to perform the interference cancellation operation according to a size of interference caused by the neighbor cell's NZP CSI-RS and a size of interference caused by the PDSCH, and may perform the interference cancellation operation according to the determination.

Figure 17A:
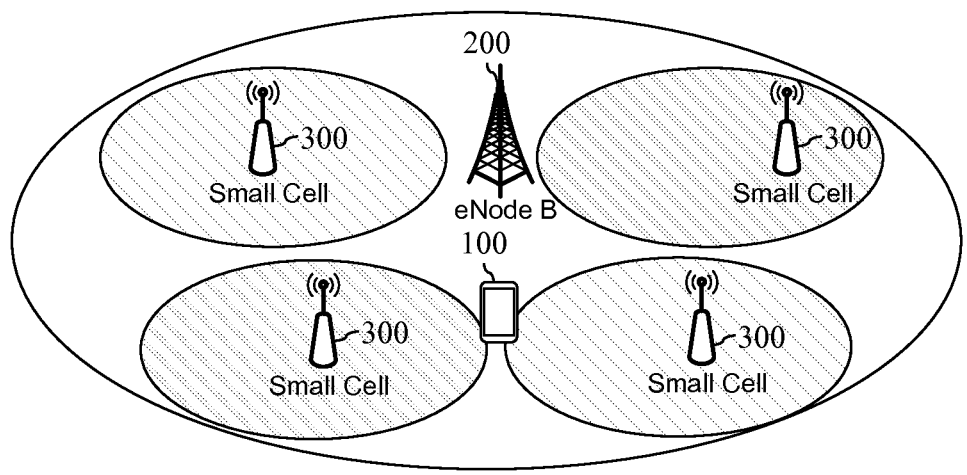
FIG. 17a illustrates a heterogeneous network environment for maximizing an effect exerted by a method according to an embodiment.
Figure 17B:
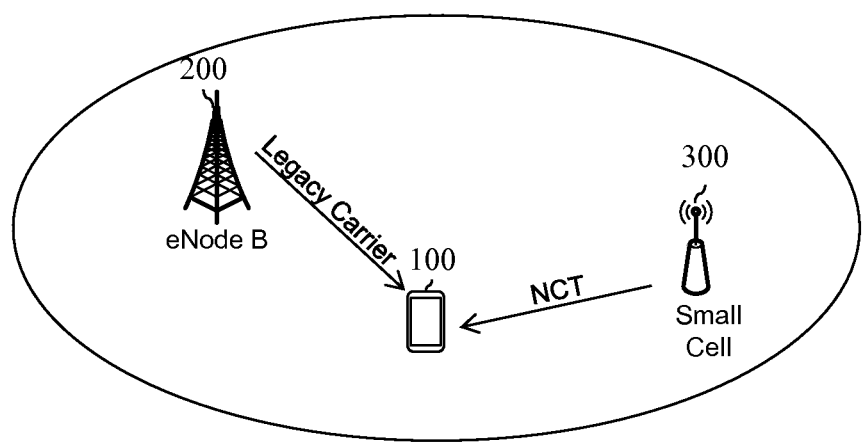
FIG. 17b illustrates another network environment for maximizing an effect exerted by a method according to an embodiment.

FIG. 17a illustrates a heterogeneous network environment for maximizing an effect exerted by a method according to an embodiment, and FIG. 17b illustrates another network environment for maximizing an effect exerted by a method according to an embodiment.

As illustrated in FIG. 17a, if a small cell 300 corresponding to a neighbor cell is deployed more densely than necessary in the coverage of a macro cell 200 corresponding to a serving cell, a CSI-RS and PDSCH from the small cells 300 may cause significantly great interference to a UE 100 of the macro cell 200a corresponding to the serving cell. In this situation, if the macro cell 200a corresponding to the serving cell transmits the network assistance information including the information regarding the CSI-RS of all of the small cells 300a and the information regarding the PDSCH to the UE 100, it may be a significantly great overhead. Therefore, according to one embodiment of the present specification, the macro cell 200a corresponding to the serving cell may transmit information regarding interference cancellation only when a traffic load is high and may not transmit it when the traffic load is not high, thereby decreasing an overhead caused by network signaling. In addition, the UE 100 performs interference cancellation depending on the information regarding interference cancellation, thereby improving channel estimation performance and reception performance while significantly decreasing complexity. In addition, the UE 100 may perform, or may not perform, an interference cancellation operation according to a power level of an interference signal against a signal power level of the serving cell, thereby saving battery consumption while decreasing a load of the UE.

Referring to FIG. 17b, for example, in a situation in which a small cell 300 exists in the coverage of a macro cell 200 in an overlapping manner, the macro cell 200a uses a downlink carrier based on 3GPP LTE/LTE-A, that is, a legacy carrier, whereas the small cell 300 uses a new carrier, i.e., a new carrier type (NCT).

The new carrier, i.e., the NCT, is under discussion for use in a next-generation wireless communication system, in order to decrease interference between a plurality of serving cells and to improve a transmission bandwidth. To extend the transmission bandwidth, it is considered in the NCT that transmission of not only a CRS but also a CSI-RS is skipped or significantly reduced. However, if the transmission of the CSI and the CSI-RS is skipped, there is a problem in that a UE cannot exactly perform channel estimation. On the other hand, according to an embodiment of the present specification, since the UE can remove interference caused by the neighbor cell's PDSCH and CSI-RS, the serving cell or the neighbor cell may not skip the transmission of the CSI-RS unlike in the NCT. That is, according to the embodiment of the present specification, since the UE can remove the interference, the serving cell can allocate the PDSCH on a resource element (RE) for transmitting the neighbor cell's NZP CSI-RS, an overhead caused by the CSI-RS can be decreased, and a resource can be more effectively used.

The embodiments illustrated above may be implemented by various instruments. For example, the embodiments of the present invention may be implemented by hardware, firmware, software, or combinations thereof, which will be described in detail with reference to FIG. 13.

Figure 18:
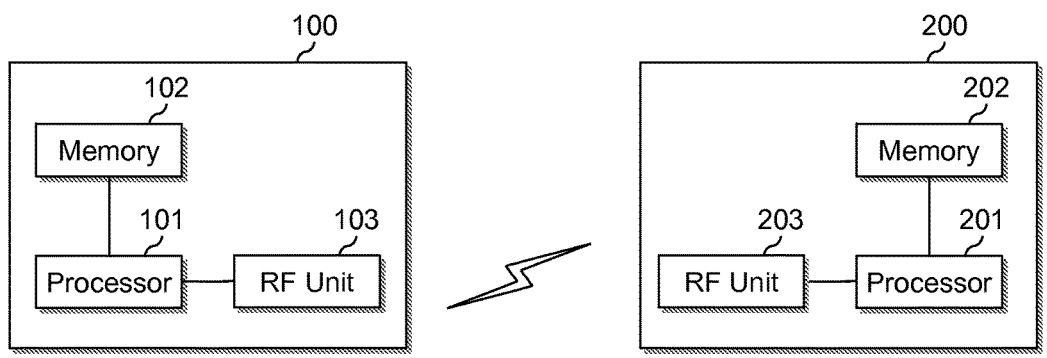
FIG. 18 is a block diagram illustrating a wireless communication system according to an embodiment of the present invention.

FIG. 18 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of transmitting network assistance information in a serving cell in order to perform interference cancellation of a terminal, the method comprising:
   checking, by the serving cell, whether a traffic load of the serving cell is greater than or less than a first value;

checking, by the serving cell, whether a traffic load of a neighbor cell is greater than or less than a second value;
determining a target for which the interference cancellation is to be performed by the terminal, based on a result of the checking the traffic load of the serving cell and a result of the checking the traffic load of the neighbor cell; and
transmitting to the terminal the network assistance information including information regarding the determined target for which the interference cancellation is to be performed,
wherein if the traffic load of the serving cell is less than the first value and the traffic load of the neighbor cell is less than the second value, the target for which the interference cancellation is to be performed by the terminal is determined as null.

2. The method of claim 1, wherein the determining of the interference cancellation target includes determining whether the target for which the interference cancellation is to be performed is the neighbor cell's channel state indicator-reference signal (CSI-RS) or a physical downlink shared channel (PDSCH).

3. The method of claim 1, wherein if the traffic load of the serving cell is less than the first value and the traffic load of the neighbor cell is less than the second value, a zero power (ZP) channel state indicator-reference signal (CSI-RS) is allocated by the serving cell at a location of the neighbor cell's non zero power (NZP) CSI-RS resource.

4. The method of claim 1, wherein if the traffic load of the serving cell is less than the first value and the traffic load of the neighbor cell is greater than the second value, the neighbor cell's physical downlink shared channel (PDSCH) is determined as the target for which the interference cancellation is to be performed by the terminal.

5. The method of claim 1, wherein if the traffic load of the serving cell is greater than the first value and the traffic load of the neighbor cell is less than the second value, a neighbor cell's non zero power (NZP) channel state indicator-reference signal (CSI-RS) is determined as the target for which the interference cancellation is to be performed by the terminal.

6. The method of claim 1, wherein if the traffic load of the serving cell is greater than the first value and the traffic load of the neighbor cell is greater than the second value, the neighbor cell's channel state indicator-reference signal (CSI-RS) and physical downlink shared channel (PDSCH) are determined as the target for which the interference cancellation is to be performed by the terminal.

7. The method of claim 1, wherein if the neighbor cell's non zero power (NZP) channel state indicator-reference signal (CSI-RS) is determined as the target for which the interference cancellation is to be performed by the terminal, the network assistance information includes one or more of the number of neighbor cell's antenna ports, resource configuration information of the CSI-RS, subframe configuration information of the CSI-RS, a scrambling code seed, and information of a power ratio between a physical downlink shared channel (PDSCH) and the CSI-RS.

8. A serving cell base station for transmitting network assistance information in order to perform interference cancellation of a terminal, the serving cell base station comprising:

a transceiver; and
a processor configured to:
check whether a traffic load of a serving cell associated with the serving cell base station is greater than or less than a first value,
check whether a traffic load of a neighbor cell is greater than or less than a second value,
determine a target for which the interference cancellation is to be performed by the terminal, based on a result of the check of the traffic load of the serving cell and a result of the check of the traffic load of the neighbor cell, and
control the transceiver to transmit to the terminal the network assistance information including information regarding the determined target for which the interference cancellation is to be performed,
wherein if the traffic load of the serving cell is less than the first value and the traffic load of the neighbor cell is less than the second value, the processor determines the target for which the interference cancellation is to be performed by the terminal as null.

9. The serving cell base station of claim 8, wherein the processor determines whether the target for which the interference cancellation is to be performed by the terminal is a neighbor cell's channel state indicator-reference signal (CSI-RS) or a physical downlink shared channel (PDSCH).

10. The serving cell base station of claim 8, wherein if the traffic load of the serving cell is less than the first value and the traffic load of the neighbor cell is less than the second value, the processor allocates a zero power (ZP) channel state indicator-reference signal (CSI-RS) at a location of the neighbor cell's non zero power (NZP) CSI-RS resource.

11. The serving cell base station of claim 8, wherein if the traffic load of the serving cell is less than the first value and the traffic load of the neighbor cell is greater than the second value, the processor determines the neighbor cell's physical downlink shared channel (PDSCH) as the target for which the interference cancellation is to be performed by the terminal.

12. The serving cell base station of claim 8, wherein if the traffic load of the serving cell is over the first value and the traffic load of the neighbor cell is less than the second value, the processor determines the neighbor cell's non zero power (NZP) channel state indicator-reference signal (CSI-RS) as the target for which the interference cancellation is to be performed by the terminal.

13. The serving cell base station of claim 8, wherein if the traffic load of the serving cell is greater than the first value and the traffic load of the neighbor cell is greater than the second value, the processor determines the neighbor cell's channel state indicator-reference signal (CSI-RS) and physical downlink shared channel (PDSCH) as the target for which the interference cancellation is to be performed by the terminal.

14. The serving cell base station of claim 8, wherein if the neighbor cell's non zero power (NZP) channel state indicator-reference signal (CSI-RS) is determined as the target for which the interference cancellation is to be performed by the terminal, the network assistance information includes one or more of the number of neighbor cell's antenna ports, resource configuration information of the CSI-RS, subframe configuration information of the CSI-RS, a scrambling code seed, and information of a power ratio between a physical downlink shared channel (PDSCH) and the CSI-RS.

* * * * *